(12) United States Patent
Ono

(10) Patent No.: US 11,272,098 B2
(45) Date of Patent: Mar. 8, 2022

(54) IMAGING APPARATUS AND IMAGING MODULE

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 389 days.

(21) Appl. No.: 16/442,551

(22) Filed: Jun. 17, 2019

(65) Prior Publication Data

US 2019/0313018 A1  Oct. 10, 2019

Related U.S. Application Data

(63) Continuation of application No. PCT/JP2017/041099, filed on Nov. 15, 2017.

(30) Foreign Application Priority Data

Dec. 27, 2016 (JP) .............................. JP2016-253325

(51) Int. Cl.
*H04N 5/232* (2006.01)
*H04N 5/217* (2011.01)
(Continued)

(52) U.S. Cl.
CPC .......... *H04N 5/23229* (2013.01); *G02B 3/00* (2013.01); *G02B 3/08* (2013.01); *G03B 11/00* (2013.01);
(Continued)

(58) Field of Classification Search
CPC .... H04N 5/23229; H04N 5/217; H04N 5/225; H04N 5/2253; H04N 5/2254;
(Continued)

(56) References Cited

U.S. PATENT DOCUMENTS 6,246,796 B1 *  6/2001  Horikoshi ............ G03H 1/0005
                                                  375/E7.09
9,892,812 B2  2/2018  Zheng et al.
(Continued)

FOREIGN PATENT DOCUMENTS

CN     103299166     9/2013
CN     104885187     9/2015
(Continued)

OTHER PUBLICATIONS

"Office Action of China Counterpart Application", dated Jun. 16, 2020, with English translation thereof, pp. 1-12.
(Continued)

*Primary Examiner* — Mekonnen D Dagnew
(74) *Attorney, Agent, or Firm* — JCIPRNET

(57) ABSTRACT

The present invention provides an imaging apparatus that individually obtains high image quality, restored images for a plurality of different directions at a wide angle of view without using a lens, and an imaging module using such an imaging apparatus. In an imaging apparatus according to an aspect of the invention, incident light is divided into a plurality of azimuthal regions by a directional sensor, and images corresponding to the azimuthal regions are restored from a plurality of projection images acquired corresponding to the azimuthal regions. Accordingly, incident light from oblique directions does not become noise to incident light from a front direction, and projection images can be individually acquired for the azimuthal regions throughout a wide range from the front direction to the oblique directions. For this reason, restoration processing according to properties of a pattern mask and the projection images is executed, whereby it is possible to individually obtain high image quality restored image for a plurality of different directions
(Continued)

(azimuthal regions) at a wide angle of view without using a lens.

16 Claims, 28 Drawing Sheets

(51) Int. Cl.
| | | |
|---|---|---|
| *H04N 5/225* | (2006.01) | |
| *G03B 11/00* | (2021.01) | |
| *G03B 15/00* | (2021.01) | |
| *G02B 3/00* | (2006.01) | |
| *G02B 3/08* | (2006.01) | |

(52) U.S. Cl.
CPC ............. *G03B 15/00* (2013.01); *H04N 5/217* (2013.01); *H04N 5/225* (2013.01); *H04N 5/2253* (2013.01); *H04N 5/2254* (2013.01); *H04N 5/232* (2013.01)

(58) Field of Classification Search
CPC ...... H04N 5/232; H04N 5/22541; G02B 3/00; G02B 3/08; G03B 11/00; G03B 15/00
See application file for complete search history.

(56) References Cited

U.S. PATENT DOCUMENTS

| | | | |
|---|---|---|---|
| 10,423,002 B2 * | 9/2019 | Shimano | G02B 5/1823 |
| 10,679,763 B2 | 6/2020 | Zheng et al. | |
| 10,911,668 B2 * | 2/2021 | Naruse | H04N 5/357 |
| 2010/0060962 A1 * | 3/2010 | Rosen | G03H 1/06 359/29 |
| 2014/0049451 A1 * | 2/2014 | Sugiyama | G02B 27/01 345/8 |
| 2018/0136480 A1 | 5/2018 | Shimano | |
| 2019/0278006 A1 * | 9/2019 | Tajima | G02B 27/4205 |

FOREIGN PATENT DOCUMENTS

| | | |
|---|---|---|
| JP | 2009212382 | 9/2009 |
| JP | 2013235055 | 11/2013 |
| WO | 2012058360 | 5/2012 |
| WO | 2016123529 | 8/2016 |
| WO | 2016203573 | 12/2016 |

OTHER PUBLICATIONS

"International Search Report (Form PCT/ISA/210) of PCT/JP2017/041099," dated Jan. 30, 2018, with English translation thereof, pp. 1-3.

"Written Opinion of the International Searching Authority (Form PCT/ISA/237) of PCT/JP2017/041099," dated Jan. 30, 2018, with English translation thereof, pp. 1-7.

Hitachi, Ltd., "Developed lensless camera technology that allows easy focus adjustment after video recording," with English translation thereof, Nov. 15, 2016, Available at: http://www.hitachi.co.jp/New/cnews/month/2016/11/1115.html, [searched on Dec. 15, 2016].

ascii.jp, "New technology "FlatCam" that can shoot images without a lens," with English translation thereof, Nov. 25, 2019, Available at: http://ascii.jp/elem/000/001/083/1083322/, [searched on Dec. 13, 2016].

* cited by examiner

FAR ⟵⟶ NEAR

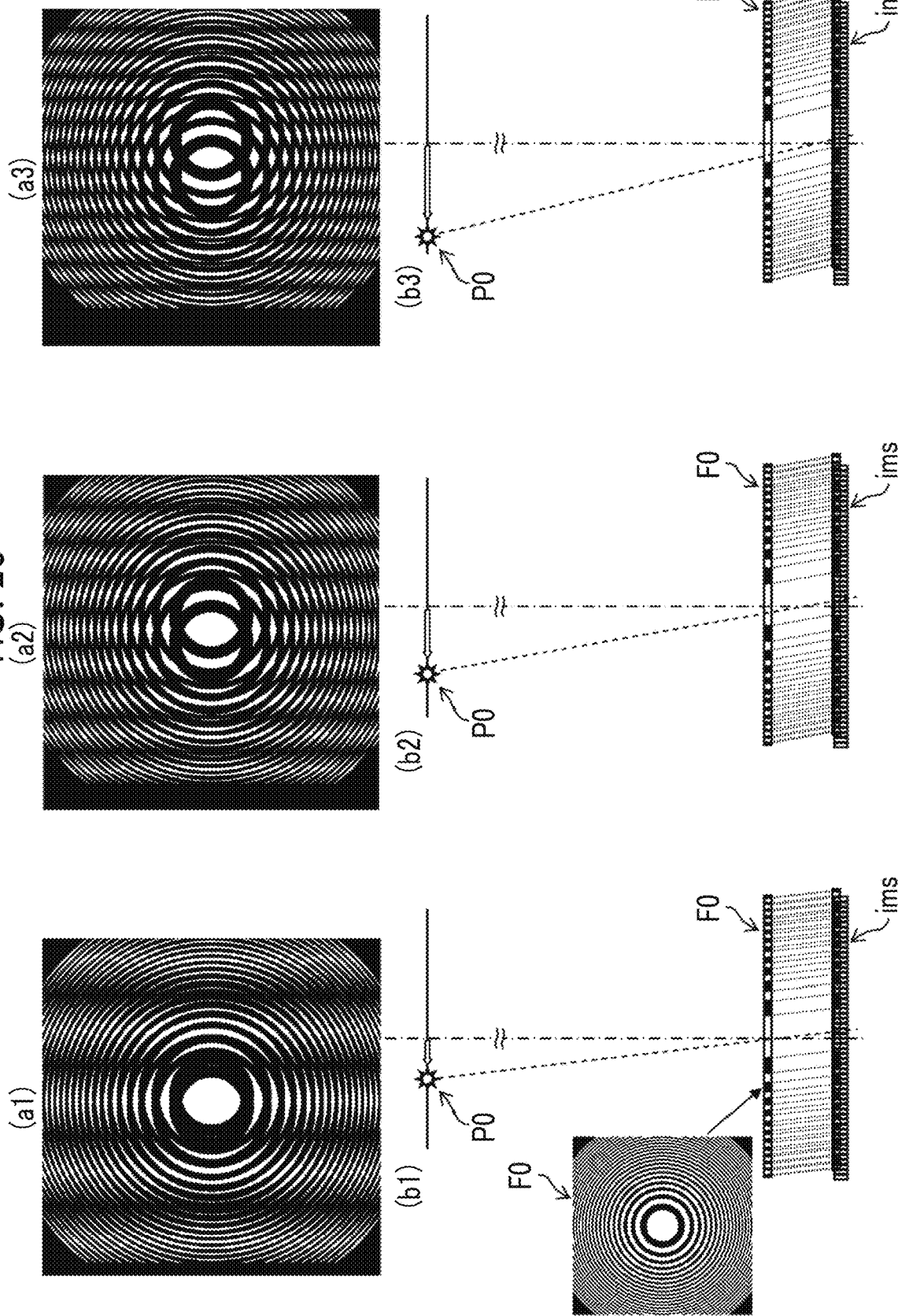

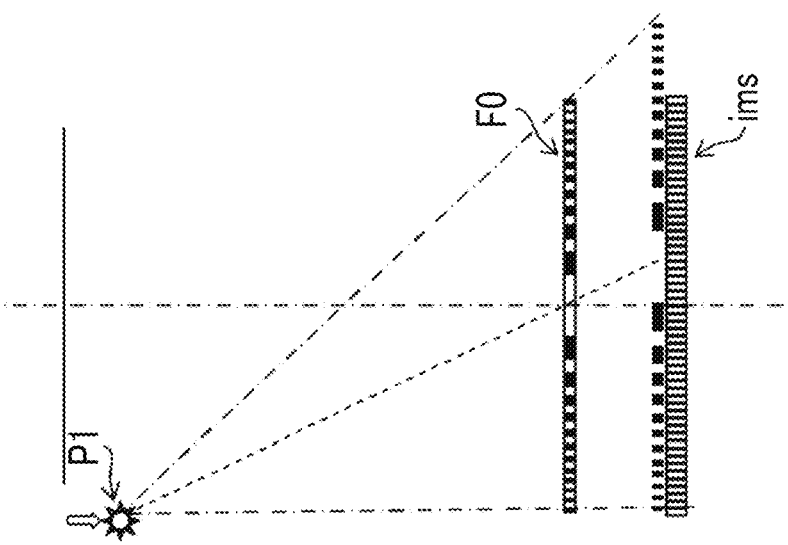
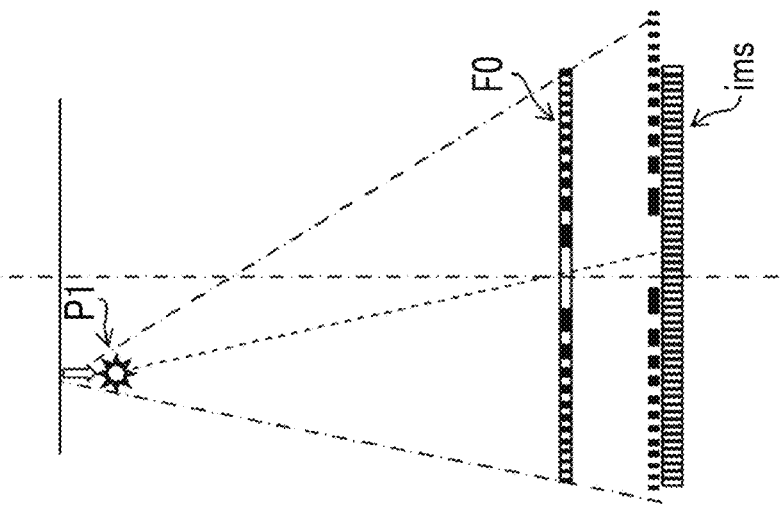
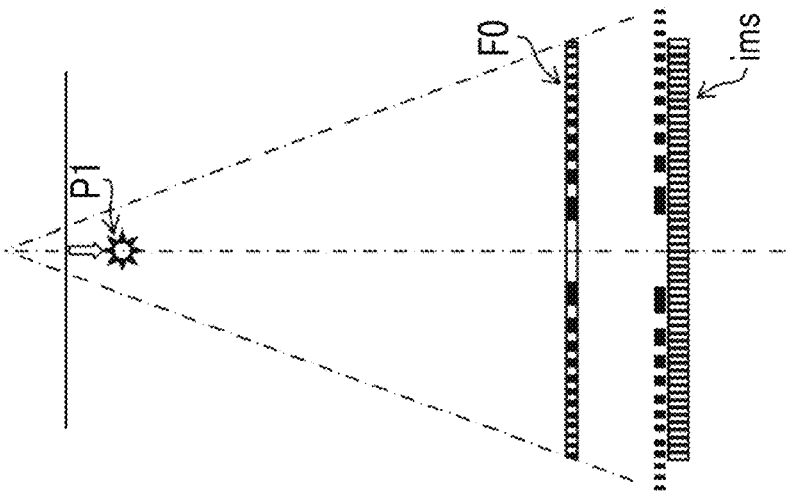

IMAGING APPARATUS AND IMAGING MODULE

CROSS-REFERENCE TO RELATED APPLICATIONS

The present application is a Continuation of PCT International Application No. PCT/JP2017/041099 filed on Nov. 15, 2017 claiming priority under 35 U.S.C. § 119(a) to Japanese Patent Application No. 2016-253325 filed on Dec. 27, 2016. Each of the above applications is hereby expressly incorporated by reference, in their entirety, into the present application.

BACKGROUND OF THE INVENTION

1. Field of the Invention

The present invention relates to an imaging apparatus and an imaging module, and in particular, to an imaging apparatus and an imaging module that acquire an image of a subject with no lens.

2. Description of the Related Art

An imaging apparatus and an imaging module are in general of a type in which an optical image of a subject is formed using a lens, and in recent years, a technique that acquires an image of a subject with no lens has been developed. For example, in "Development of lensless camera technology for adjusting focus after video imaging", [online], Nov. 15, 2016, Hitachi, Ltd., [Searched on Dec. 15, 2016], Internet (http://www.hitachi.co.jp/New/cnews/month/2016/11/1115.html), a Fresnel zone plate is arranged close to an imaging element, and moire fringes obtained by superimposing a projection image formed on the imaging element with light from a subject and a projection pattern corresponding to the Fresnel zone plate are subjected to Fourier transform, whereby it is possible to acquire an image of the subject with no lens.

In "New technology for capturing image with no lens "FlatCam"", [online], Nov. 25, 2015, ASCII. JP, [Searched on Dec. 13, 2016], Internet (http://ascii.jp/elem/000/001/083/1083322/), a mask with a lattice pattern is provided close to an imaging element, and a projection image formed on the imaging element is restored with the mask, whereby it is possible to acquire an image of a subject with no lens.

SUMMARY OF THE INVENTION

According to the techniques of "Development of lensless camera technology for adjusting focus after video imaging", [online], Nov. 15, 2016, Hitachi, Ltd., [Searched on Dec. 15, 2016], Internet (http://www.hitachi.co.jp/New/cnews/month/2016/11/1115.html) and "New technology for capturing image with no lens "FlatCam"", [online], Nov. 25, 2015, ASCII. JP, [Searched on Dec. 13, 2016], Internet (http://ascii.jp/elem/000/001/083/1083322/), since a lens for imaging is not necessary, it is possible to reduce the size of the imaging apparatus (in particular, in an optical axis direction) and to perform so-called "ex-post focusing" in which images having different focusing distances are obtained after imaging. However, the techniques in the related art have the following problems.

<Principle and Problem of Image Restoration Using Moire Fringe>

First, the principle and the problem of image restoration using moire fringes in "Development of lensless camera technology for adjusting focus after video imaging", [online], Nov. 15, 2016, Hitachi, Ltd., [Searched on Dec. 15, 2016], Internet (http://www.hitachi.co.jp/New/cnews/month/2016/11/1115.html) will be described.

<Principle of Image Restoration>

FIG. 23 is a diagram showing a projection image of a Fresnel zone plate that is formed on an image sensor (imaging element) in a case where a subject (point light source) is present at infinity. As shown in a (b1) portion of FIG. 23, in a case where the subject (point light source P0) is present in a direction near the front, and in a case where a projection image formed on an image sensor ims with a Fresnel zone plate F0 and a projection pattern corresponding to the Fresnel zone plate F0 are superimposed, moire fringes at a wide interval occur as shown in an (a1) portion of FIG. 23. A pattern in which the moire fringes occur is subjected to two-dimensional Fourier transform, whereby it is possible to restore an image of the original point light source P0. Then, in a case the point light source P0 moves in an oblique direction from a state of the (b1) portion of FIG. 23 as shown in a (b2) portion, the interval of the moire fringes becomes narrow and the number of fringes increases as shown in an (a2) portion. In a case where the point light source P0 further moves in an oblique direction as shown in a (b3) portion, the interval of the moire fringes becomes narrower and the number of fringes increases as shown in an (a3) portion.

FIGS. 24A to 24C shows a case where a subject (point light source P1) is present at a finite distance, and FIG. 25 is a diagram showing an aspect of decoding of images corresponding to FIGS. 24A to 24C. In a case where the point light source P1 is present in a substantial front direction as in FIG. 24A, a concentric projection image occurs near the center of the image sensor ims as in an (a1) portion of FIG. 25, and in a case where a projection pattern in which the center of the concentric circle is present at the center of the pattern as in an (a2) portion is superimposed on the projection image, moire fringes at a wide interval are obtained as in an (a3) portion. In contrast, in a case where the point light source P1 is present in an oblique direction as in FIG. 24B, the projection image is shifted in a right direction of the drawing as in a (b1) portion of the FIG. 25, and in a case where a projection pattern (the same as the (a2) portion) shown in a (b2) portion is superimposed on the projection image, moire fringes in which the interval becomes narrower and the number of fringes is greater than in the (a3) portion are obtained as in a (b3) portion. In a case where the point light source P1 is present in a further oblique direction as in FIG. 24C, the projection image is further shifted in the right direction of the drawing as in a (c1) portion of FIG. 25, and in a case where a projection pattern (the same as the (a2) portion and the (b2) portion) shown in a (c2) portion is superimposed on the projection image, moire fringes in which the interval becomes narrower and the number of fringes is greater than in the (b3) portion are obtained as in a (c3) portion. In the (a1) portion to the (c3) portion of FIG. 25, a peripheral portion is brought into a state in which the pitch of the pattern becomes minute, and brightness and darkness are hardly visually recognized.

In this way, when the point light source P1 is present in a direction farther from the front, the projection image of the Fresnel zone plate F0 is shifted more largely, and the pitch of the moire fringes becomes more minute. Since the projection image is blurred under the influence of light diffraction, the minute pattern is not formed on the image sensor ims and is in a state of having no signal (brightness and darkness) strength. Since there is a limit to the resolution of the image sensor ims, minute moire fringes (fringe in the (c3) portion of FIG. 25) that are formed in a case where the point light source P1 are present in a direction far from the front is hardly detected. In a case where moire fringes cannot be detected, since restoration to a point image is not made even though Fourier transform is performed, it is not possible to obtain information of the subject (point light source P1). Meanwhile, even in this case, the moire fringes are incident on the image sensor ims as light. Accordingly, light incident from the oblique direction far from the front becomes a useless bias component enough to raise an input signal of the image sensor ims. An increase in the amount of useless bias components means that a component of an intrinsically desired signal (parallel moire fringes) is buried, causing a decrease in an SN ratio. That is, in a case where light in a wide angle range is received, the SN ratio decreases.

In such a case, in a case where an individual projection image is obtained in each incidence direction, a projection pattern (a pattern in the (a2) portion, the (b2) portion, or the (c2) portion of FIG. 25) is superimposed on the projection image, it is possible to obtain moire fringes that can be detected even on light incident from the oblique direction with the image sensor ims. However, in the techniques of the related art, light from different directions (front direction and oblique directions) overlap on the image sensor, and it is not possible to separate and individually acquire projection images with different directions. Accordingly, it is not possible to individually obtain moire fringes corresponding to a plurality of different directions. As a result, as described above, light incident from the oblique directions becomes a bias component, and an SN ratio of a restored image decreases.

Such a problem will be further described referring to FIGS. 26 to 28. FIG. 26 is a diagram showing a state in which light of point light sources P2A, P2B, and P2C is incident on an image sensor ims arranged close to a Fresnel zone plate F0 from an azimuth A, an azimuth B, and an azimuth C. In the techniques of "Development of lensless camera technology for adjusting focus after video imaging", [online], Nov. 15, 2016, Hitachi, Ltd., [Searched on Dec. 15, 2016], Internet (http://www.hitachi.co.jp/New/cnews/month/2016/11/1115.html) and "New technology for capturing image with no lens "FlatCam"", [online], Nov. 25, 2015, ASCII. JP, [Searched on Dec. 13, 2016], Internet (http://ascii.jp/elem/000/001/083/1083322/) described above, a state in which light from a plurality of different directions (azimuths A, B, and C) is added in this way is detected by the image sensor ims. In this case, focusing on only a component of each direction, in the front direction (the azimuth B of FIG. 26), observable moire fringes (the interval of brightness and darkness and the difference in signal intensity are large) is obtained as shown in a (b1) portion and a (b2) portion of FIG. 27. Meanwhile, in the oblique direction (azimuth A), moire fringes are excessively minute and the difference of brightness and darkness of the fringe is hardly detected as shown in an (a1) portion and an (a2) portion of FIG. 27. Even in the reverse oblique direction (azimuth C), moire fringes are excessively minute and the difference of brightness and darkness of the fringe is hardly detected as shown in a (c1) portion and a (c2) portion of FIG. 27.

In this way, in the technique of "Development of lensless camera technology for adjusting focus after video imaging", [online], Nov. 15, 2016, Hitachi, Ltd., [Searched on Dec. 15, 2016], Internet (http://www.hitachi.co.jp/New/cnews/month/2016/11/1115.html), since a state in which light from a plurality of different directions (azimuths A, B, and C) is added is detected by the image sensor ims, as a total signal intensity distribution, components of the oblique directions (azimuths A and C) are superimposed as bias components on a signal component (azimuth B) as shown in FIG. 28, and the SN ratio is decreased.

In order to restrain a decrease in the SN ratio, a case where light from the oblique directions is shielded is considered. FIG. 29 is a diagram showing a state in which light from oblique directions (azimuths A and C) is shielded by a tubular hood Ho. In a case where light is shielded in this way, in the front direction (azimuth B), observable moire fringes (the interval of brightness and darkness and the difference in signal intensity are large) are obtained as shown in a (b1) portion and a (b2) portion of FIG. 30, and in the oblique direction (azimuth A), light is shielded and there are no components forming moire fringes (signal intensity is substantially zero) as shown in an (a1) portion and an (a2) portion of FIG. 30. Even in the reverse oblique direction (azimuth C), there are no components forming moire fringes due to light shielding (signal intensity is substantially zero) as shown in a (c1) portion and a (c2) portion. Accordingly, a total signal intensity distribution substantially has only a signal component from the front direction (azimuth B) as shown in FIG. 31, and the SN ratio is improved compared to a case where the hood Ho is not provided (FIGS. 26 to 28). However, since light from the oblique directions is shielded, an angle of view becomes narrow.

Even in a case of "New technology for capturing image with no lens "FlatCam"", [online], Nov. 25, 2015, ASCII. JP, [Searched on Dec. 13, 2016], Internet (http://ascii.jp/elem/000/001/083/1083322/), as in a case of "Development of lensless camera technology for adjusting focus after video imaging", [online], Nov. 15, 2016, Hitachi, Ltd., [Searched on Dec. 15, 2016], Internet (http://www.hitachi.co.jp/New/cnews/month/2016/11/1115.html), since light from the front direction and light from the oblique directions are superimposed on the image sensor, light from the oblique directions becomes a bias component and the SN ratio decreases. In a case where light from the oblique directions is cut in order to improve the SN ratio, the angle of view becomes narrow.

In this way, according to the techniques of the related art, it is not possible to individually obtain high image quality projection images throughout different directions at a wide angle of view in a situation in which a lens is not used, and as a result, high image quality restored images are not individually obtained for a plurality of directions.

The invention has been accomplished in consideration of such a situation, and an object of the invention is to provide an imaging apparatus that individually obtains high image quality restored images for a plurality of different directions at a wide angle of view without using a lens. Furthermore, an object of the invention is to provide an imaging module that individually obtains high image quality projection images for a plurality of different directions at a wide angle of view without using a lens.

In order to achieve the above-described object, a first aspect of the invention provides an imaging apparatus comprises a pattern mask in which a transmissive region transmitting incident light and a light shielding region shielding incident light are arranged, a directional sensor that has a light receiving surface close to which the pattern mask is provided, receives a projection image of the pattern mask with light from a subject through the pattern mask, divides the light incident on the pattern mask from the subject into a plurality of azimuthal regions with different directions, and acquires a plurality of the projection images corresponding to the plurality of divided azimuthal regions, and a restored image generation unit that restores and generates a plurality of images of the subject corresponding to the plurality of azimuthal regions from the plurality of acquired projection images.

In the imaging apparatus according to the first aspect, incident light is divided into a plurality of azimuthal regions by the directional sensor, and images corresponding to the azimuthal regions are restored from a plurality of projection images acquired corresponding to the azimuthal regions. Accordingly, incident light from the oblique directions does not become noise to incident light from the front direction, and it is possible to individually acquire the projection images for the azimuthal regions throughout a wide angle of view from the front direction to the oblique directions. For this reason, restoration processing according to the properties of the pattern mask and the projection images is executed, whereby it is possible to individually obtain high image quality restored image for a plurality of different directions (azimuthal regions) at a wide angle of view without using a lens.

In the first aspect, the "azimuthal region" means a three-dimensional region having a spread in an optical axis direction and directions a direction (for example, a horizontal direction and a vertical direction) perpendicular to the optical axis with respect to a specific azimuth. The restored and generated images of the subject may be static images or video.

According to a second aspect, in the imaging apparatus according to the first aspect, a pattern of the arrangement is a pattern in which the transmissive region and the light shielding region compose a Fresnel zone plate, and the restored image generation unit comprises a composition processing unit that superimposes the plurality of acquired projection images and a projection pattern corresponding to the Fresnel zone plate through image processing, and a restoration processing unit that performs Fourier transform on a plurality of moire fringes formed of the plurality of projection images and the projection pattern superimposed and restores and generates the plurality of images of the subject. The second aspect prescribes another aspect of the pattern mask. In a case where a pattern mask composed of a Fresnel zone plate is used, moire fringes having the number of fringes (interval) according to the direction of the subject occur by superimposing the projection images and the projection patterns, and the images of the subject can be restored by performing Fourier transform on the moire fringes.

In this way, in the second aspect, restoration processing (Fourier transform of the moire fringes acquired using the Fresnel zone plate) according to the properties of the pattern mask and the projection images is executed, whereby it is possible to individually obtain high image quality restored image for a plurality of different directions (azimuthal regions) at a wide angle of view without using a lens. Since image processing for superimposing the projection images and the projection patterns is executed through addition, a calculation load is small.

According to a third aspect, in the imaging apparatus according to the second aspect, the composition processing unit superimposes the plurality of projection images and a plurality of projection patterns corresponding to the plurality of projection images obtained by shifting the projection pattern corresponding to the Fresnel zone plate according to directions of the plurality of azimuthal regions through image processing. The projection images on the directional sensor are formed at different positions according to the direction of the subject (the directions of the azimuthal regions). Accordingly, the projection patterns are also shifted corresponding to the projection images, whereby it is possible to obtain high image quality restored images.

According to a fourth aspect, in the imaging apparatus according to the third aspect, the plurality of azimuthal regions include a center region of an imaging range centering on a direction perpendicular to a surface of the Fresnel zone plate, and the composition processing unit superimposes the projection pattern corresponding to the Fresnel zone plate on a projection image of the center region among the plurality of projection images through image processing. The fourth aspect prescribes that the projection pattern is not shifted and is superimposed on the projection image of the center region of the imaging range.

According to a fifth aspect, the imaging apparatus according to the third or fourth aspect further comprises a storage unit that stores the plurality of projection patterns, and a magnification unit that reads the plurality of projection patterns from the storage unit and magnifies the plurality of projection patterns according to a distance of the subject, and the composition processing unit superimposes the plurality of projection images and the plurality of projection patterns magnified by the magnification unit through image processing. In a case where the distance of the subject (light source) is infinite, parallel light is incident and the projection patterns and the projection image have the same size. However, when the distance of the subject decreases, light having a spread is incident and the projection image becomes large. Accordingly, the projection pattern to be superimposed also needs to be magnified. Therefore, as in the fifth aspect, the projection patterns magnified according to the distance and the projection images are superimposed, whereby it is possible to obtain appropriate restored images and to adjust a focusing state.

In the fifth aspect, the magnification ratio may be constant without depending on the azimuthal regions, or the magnification ratio may be changed depending on the azimuthal region. The magnification ratio is changed depending on the azimuthal regions, whereby it is possible to change a focusing distance (focusing state) for each azimuthal region. When the distance of the subject decreases, light having a spread is incident and the projection image becomes large. Accordingly, the projection pattern that is smaller than the sizes of the projection images and the pattern mask is not superimposed. Therefore, the projection patterns having the same size as the pattern mask are stored, whereby it is possible to "magnify" the projection patterns and to perform superimposition.

According to a sixth aspect, the imaging apparatus according to the fifth aspect further comprises a display unit that displays an image restored by the restoration processing unit, and an instruction input unit through which an instruction on a magnification ratio of the plurality of projection patterns or a subject distance is manually input, and the magnification unit magnifies the plurality of projection patterns read from the storage unit based on an instruction input of the magnification ratio or the subject distance from the instruction input unit. According to the sixth aspect, the projection patterns are magnified based on the instruction input of a user, whereby it is possible to allow the user to manually adjust the focusing state of the restored images.

According to a seventh aspect, the imaging apparatus according to the fifth aspect further comprises a magnification ratio acquisition unit that automatically acquires a magnification ratio of the plurality of projection patterns at which resolution of an image restored by the restoration processing unit becomes maximum, and the magnification unit magnifies the plurality of projection patterns read from the storage unit based on the magnification ratio acquired by the magnification ratio acquisition unit. According to the seventh aspect, it is possible to automatically obtain restored images focused on the distance corresponding to the acquired magnification ratio.

According to an eighth aspect, the imaging apparatus according to the third or fourth aspect further comprises a storage unit that stores a plurality of projection patterns with different magnification ratios according to a subject distance as the plurality of projection patterns, a display unit that displays an image restored by the restoration processing unit, and an instruction input unit through which an instruction on a magnification ratio of the plurality of projection patterns or a subject distance is manually input, and the composition processing unit, based on an instruction input of the magnification ratio or the subject distance from the instruction input unit, reads the plurality of projection patterns with the corresponding magnification ratio from the storage unit and superimposes the plurality of projection images and the plurality of read projection patterns through image processing. In the eighth aspect, since a plurality of projection patterns with different magnification ratios according to the subject distance are stored. It is possible to reduce a load of processing compared to a case where one kind of projection pattern is magnified according to the distance. Furthermore, since it is possible to allow the user to adjust the magnification ratio or the subject distance while viewing the restored images displayed on the display unit, it is possible to easily adjust the focusing state.

According to a ninth aspect, the imaging apparatus according to the third or fourth aspect further comprises a storage unit that stores a plurality of projection patterns with different magnification ratios according to a subject distance as the plurality of projection patterns, and a magnification ratio acquisition unit that automatically acquires a magnification ratio of the plurality of projection patterns at which resolution of an image restored by the restoration processing unit becomes maximum, and the composition processing unit, based on the magnification ratio acquired by the magnification ratio acquisition unit, reads the plurality of projection patterns with the corresponding magnification ratio from the storage unit and superimposes the plurality of projection images and the plurality of read projection patterns through image processing. According to the ninth aspect, since the magnification ratio at which the resolution of the restored image becomes maximum is automatically acquired and processing is performed, it is possible to automatically obtain restored images focused on a desired distance. Furthermore, since a plurality of projection patterns with different magnification ratios according to the subject distance are stored, it is possible to reduce a load of processing compared to a case where one kind of projection pattern is magnified according to the distance.

According to a tenth aspect, in the imaging apparatus according to any one of the first to ninth aspects, the directional sensor is a sensor composed of an image sensor having a plurality of pixels composed of photoelectric conversion elements arrayed in a two-dimensional manner, and a microlens array provided on an incidence surface side of the image sensor, one microlens composing the microlens array being provided for every a plurality of pixels corresponding to the plurality of azimuthal regions, light incident on each microlens being divided into and incident on a plurality of pixels corresponding to the plurality of azimuthal regions. The tenth aspect prescribes one aspect of the directional sensor. A plurality of pixels for which one microlens is provided correspond to different azimuthal regions. Then, it is possible to obtain the restored images corresponding to the azimuthal regions based on information of the pixels corresponding to the azimuthal regions.

According to an eleventh aspect of the invention, in the imaging apparatus according to any one of the first to ninth aspects, the directional sensor is a sensor composed of an image sensor having a plurality of pixels composed of photoelectric conversion elements arrayed in a two-dimensional manner, a microlens array provided for each pixel of the image sensor, and a plurality of kinds of light shielding masks which are provided between the pixels of the image sensor and the microlenses of the microlens array, respectively, and in which openings corresponding to the plurality of azimuthal regions are formed. The eleventh aspect prescribes another aspect of the directional sensor. The positions, sizes, shapes, or the like of the light shielding masks are changed, whereby it is possible to selectively receive light from different azimuthal regions. With this, as in the tenth aspect, it is possible to individually obtain the restored images corresponding to the azimuthal regions based on information of the pixels corresponding to the azimuthal regions.

According to a twelfth aspect, in the imaging apparatus according to the eleventh aspect, the plurality of kinds of light shielding masks are arranged in the same density for a plurality of pixels of the image sensor. The twelfth aspect prescribes one aspect of the arrangement of the light shielding masks. A plurality of kinds of light shielding masks are arranged in the same density for a plurality of pixels of the image sensor. Accordingly, the density of the image sensor becomes the same for each azimuthal region, and it is possible to obtain the restored images with uniform image quality in all azimuthal regions (an entire range of an imaging angle of view).

According to a thirteenth aspect, in the imaging apparatus according to the eleventh aspect, the plurality of kinds of light shielding masks are arranged in different densities for a plurality of pixels of the image sensor. The thirteenth aspect prescribes another aspect of the arrangement of the light shielding masks. For a desired azimuthal region, an image sensor having light shielding masks of a pattern corresponding to the azimuthal region is arranged in a high density, whereby it is possible to obtain a high image quality restored image of the desired azimuthal region.

According to a fourteenth aspect, the imaging apparatus according to any one of the first to thirteenth aspects further comprises a combined image generation unit that combines the plurality of images restored by the restored image generation unit and generates one image. According to the fourteenth aspect, a plurality of restored images are combined, whereby it is possible to obtain an image in a desired azimuthal region. All of a plurality of restored images may be composed to acquire an image throughout all azimuthal regions, or restored images may be composed only for a part of regions.

According to a fifteenth aspect, in the imaging apparatus according to the first aspect, a pattern of the arrangement is an encoded pattern. The fifteenth aspect prescribes another aspect of the pattern mask. Even in a case where such a pattern mask is used, restoration processing according to the properties of the encoded pattern and the projection images is executed, whereby it is possible to individually obtain high image quality restored image for a plurality of different directions (azimuthal regions) at a wide angle of view.

According to a sixteenth aspect, in the imaging apparatus according to the first aspect, a pattern of the arrangement is a pattern in which a plurality of openings as the transmissive region are arranged in a random manner in two-dimensional directions. The sixteenth aspect prescribes another aspect of the pattern mask. Even in a case where such a pattern mask is used, restoration processing according to the properties of the pattern mask and the projection images is executed, whereby it is possible to individually obtain high image quality restored images for a plurality of different directions (azimuthal regions) at a wide angle of view. It is assumed that, for "a plurality of openings (bores)", the properties of the size, shape, position, arrangement interval, and the like (randomness) of the opening is known. In the sixteenth aspect, image restoration can be performed, for example, by the restored image generation unit performing search for a least square error for a plurality of projection images acquired using the pattern mask.

In order to achieve the above-described object, a seventeenth aspect of the invention provides an imaging module comprising a Fresnel zone plate, and a directional sensor that has a light receiving surface close to which the Fresnel zone plate is provided, receives a projection image of the Fresnel zone plate with light from a subject through the Fresnel zone plate, divides the light incident on the Fresnel zone plate from the subject into a plurality of azimuthal regions with different directions, and acquires a plurality of the projection images corresponding to the plurality of divided azimuthal regions. According to the seventeenth aspect, it is possible to individually acquire a plurality of projection images corresponding to different azimuthal regions at a wide angle of view with high image quality using the Fresnel zone plate and the directional sensor without using a lens. In the seventeenth aspect, the meaning of the "azimuthal region" is the same as in the first aspect. The projection image to be acquired may correspond to a static image (a projection image at a specific time) or may correspond to video (a plurality of projection images acquired at different times).

According to an eighteenth aspect, in the imaging module according to the seventeenth aspect, the directional sensor is a sensor composed of an image sensor having a plurality of pixels composed of photoelectric conversion elements arrayed in a two-dimensional manner, and a microlens array provided on an incidence surface side of the image sensor, one microlens composing the microlens array being provided for every a plurality of pixels corresponding to the plurality of azimuthal regions, light incident on each microlens being divided into and incident on a plurality of pixels corresponding to the plurality of azimuthal regions. The eighteenth aspect prescribes the imaging module comprising the same directional sensor as in the tenth aspect. A plurality of pixels for which one microlens is provided correspond to different azimuthal regions, and it is possible to individually obtain the projection images corresponding to the azimuthal regions based on information of the pixels corresponding to the azimuthal regions.

According to a nineteenth aspect, in the imaging module according to the seventeenth aspect, the directional sensor is a sensor composed of an image sensor having a plurality of pixels composed of photoelectric conversion elements arrayed in a two-dimensional manner, a microlens array provided for each pixel of the image sensor, and a plurality of kinds of light shielding masks which are provided between the pixels of the image sensor and the microlenses of the microlens array, respectively, and in which openings corresponding to the plurality of azimuthal regions are formed. The nineteenth aspect prescribes the imaging module comprising the same directional sensor as in the eleventh aspect. The positions, sizes, shapes, or the like of the light shielding masks are changed, whereby it is possible to selectively receive light from different azimuthal regions. With this, as in the eleventh aspect, it is possible to individually obtain the projection images corresponding to the azimuthal regions based on information of the pixels corresponding to the azimuthal regions.

According to a twentieth aspect, in the imaging module according to the nineteenth aspect, the plurality of kinds of light shielding masks are arranged in the same density for a plurality of pixels of the image sensor. According to the twentieth aspect, as in the twelfth aspect, it is possible to obtain the projection images with uniform image quality in all azimuthal regions (an entire range of an imaging angle of view).

According to a twenty-first aspect, in the imaging module according to the nineteenth aspect, the plurality of kinds of light shielding masks are arranged in different densities for a plurality of pixels of the image sensor. According to the twenty-first aspect, as in the thirteenth aspect, for a desired azimuthal region, an image sensor having light shielding masks of a pattern corresponding to the azimuthal region is arranged in a high density, whereby it is possible to obtain a high image quality projection image of the desired azimuthal region.

As described above, with the imaging apparatus of the invention, it is possible to individually obtain high image quality restored images for a plurality of different directions at a wide angle of view without using a lens. Furthermore, with the imaging module of the invention, it is possible to individually obtain high image quality projection images for a plurality of different directions at a wide angle of view without using a lens.

BRIEF DESCRIPTION OF THE DRAWINGS

FIG. 23 is a diagram showing the relationship between an incidence direction of light and moire fringes in a case where a light source is present at infinity.

FIGS. 24A to 24C are diagrams showing the relationship between an incidence direction of light and a projection image in a case where a light source is present at a finite distance.

DESCRIPTION OF THE PREFERRED EMBODIMENTS

Hereinafter, embodiments of an imaging apparatus and an imaging module according to the invention will be described in detail referring to the accompanying drawings.

First Embodiment

Figure 1:
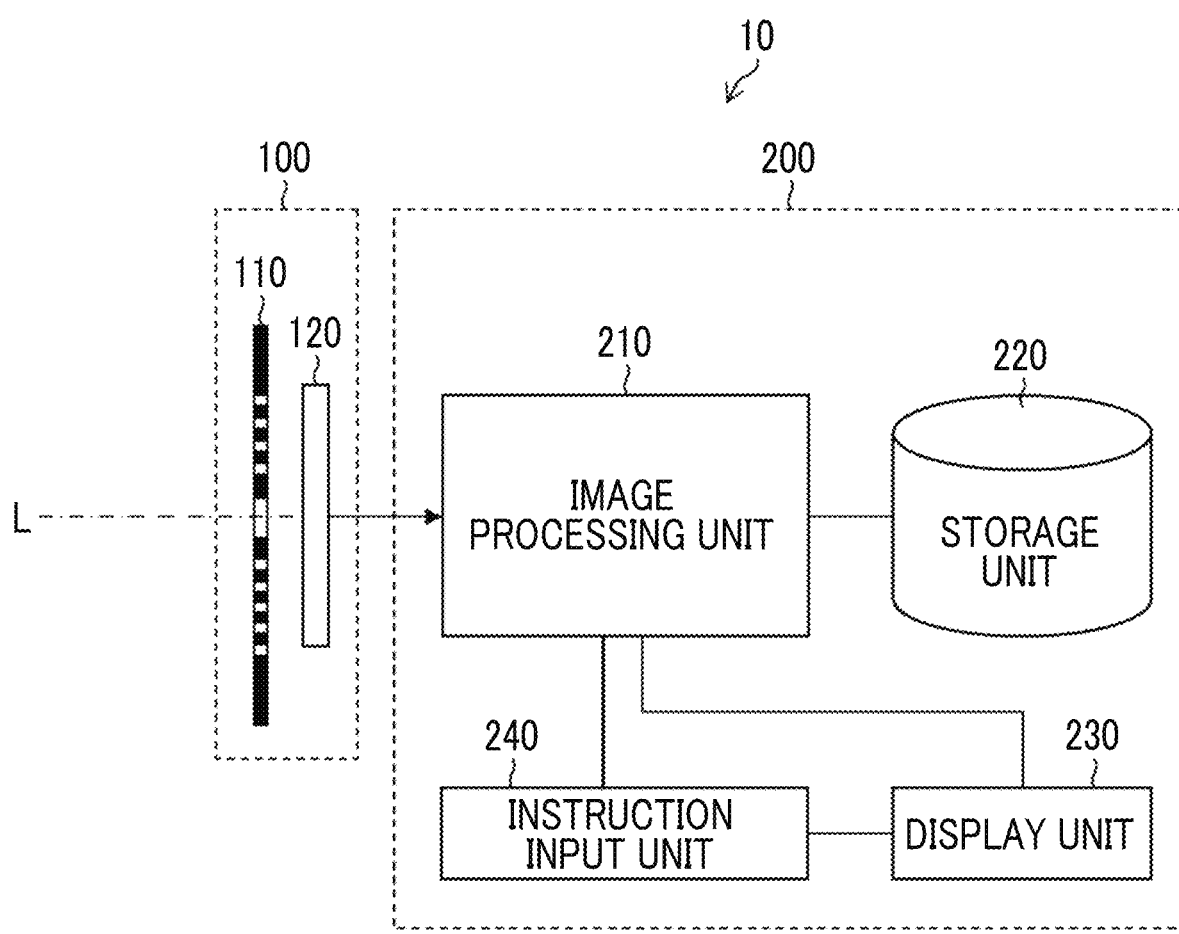
FIG. 1 is a diagram showing the configuration of an imaging apparatus according to a first embodiment of the invention.

FIG. 1 is a block diagram showing the configuration of an imaging apparatus 10 (imaging apparatus) according to a first embodiment. The imaging apparatus 10 comprises an imaging module 100 (imaging module) and an imaging apparatus body 200.

<Configuration of Imaging Module>

The imaging module 100 comprises a Fresnel zone plate 110 (pattern mask) and an imaging element 120 (directional sensor), and acquires a projection image of the Fresnel zone plate 110. The Fresnel zone plate 110 is concentric with the imaging element 120, and is arranged on a light receiving surface side of the imaging element 120 in a state parallel to the light receiving surface of the imaging element 120. In the following description, the Fresnel zone plate 110 is described as a "FZP".

<Configuration of Fresnel Zone Plate>

Figure 2:
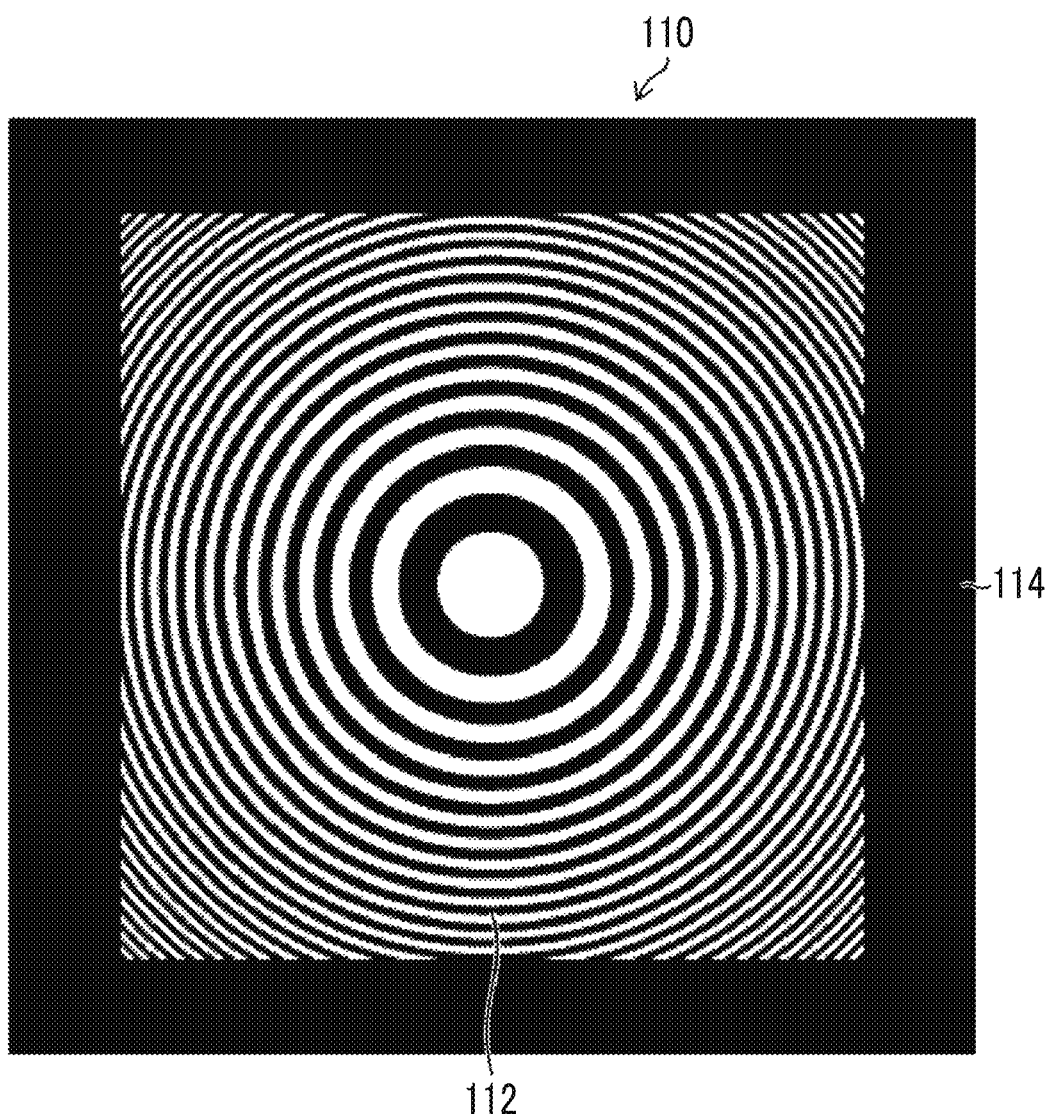
FIG. 2 is a diagram showing an example of a Fresnel zone plate.

FIG. 2 is a diagram showing the configuration of the FZP. As shown in FIG. 2, the FZP has a pattern mask portion 112 and a light shielding portion 114. In the pattern mask portion 112, a transmissive region that transmits incident light and a light shielding region that shields incident light are alternately arranged concentrically, and the transmissive regions and the light shielding regions compose the Fresnel zone plate. The interval of the concentric circles becomes narrow from the center of the pattern mask portion 112 toward the periphery. In a peripheral portion of the pattern mask portion 112, the light shielding portion 114 is provided, thereby restraining unnecessary light from being incident on the peripheral portion of the imaging element 120. An optical axis L (see FIG. 1) is an axis that passes through the centers of the FZP and the imaging element 120 and is perpendicular to the FZP and the light receiving surface of the imaging element 120. Although the FZP is arranged close to the imaging element 120 (for example, about 1 mm), since the projection image of the FZP is blurred due to light diffraction depending on the distance from the imaging element 120, it is desirable that the FZP is not too far from the imaging element 120.

<Configuration of Imaging Element>

Figure 3:
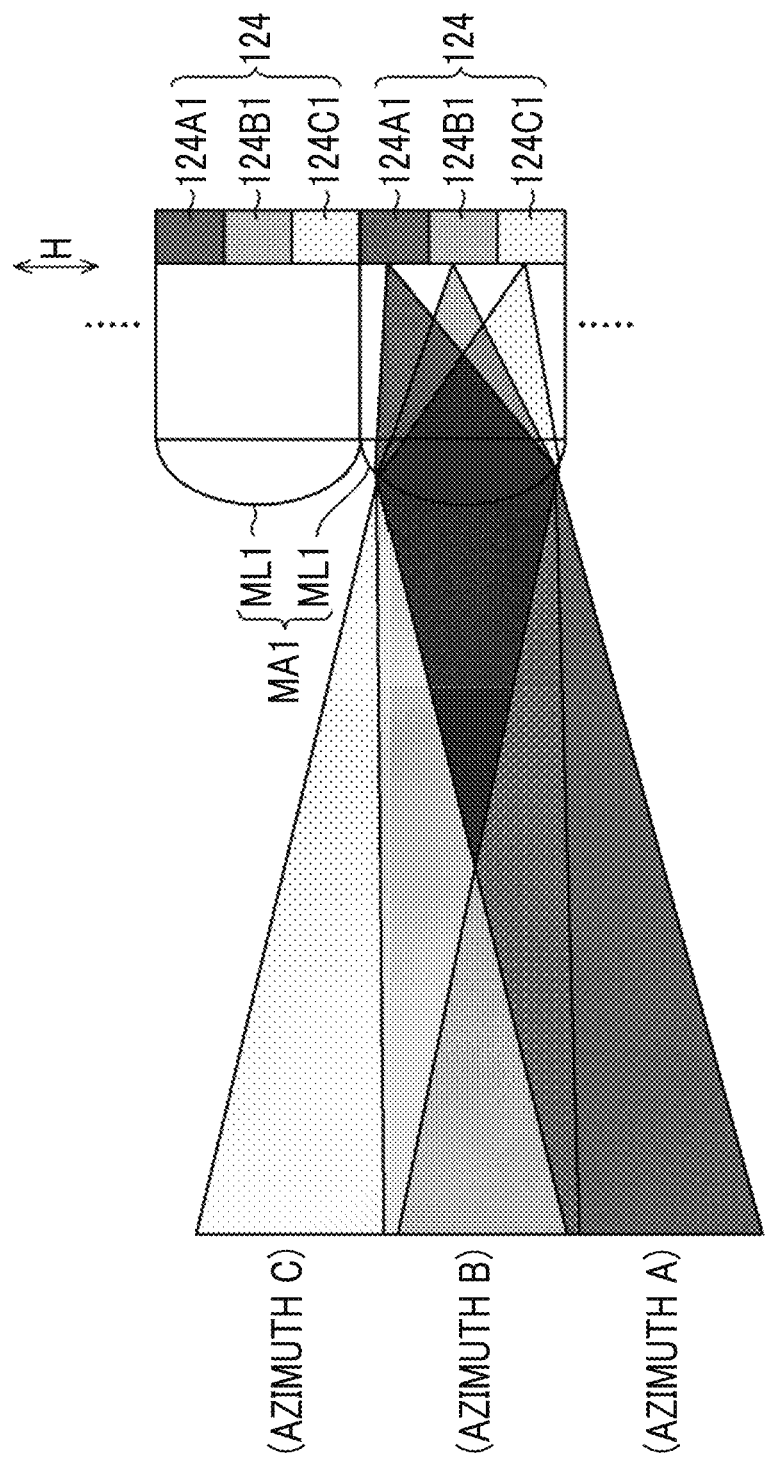
FIG. 3 is a diagram showing the configuration of a directional image sensor.

FIG. 3 is a diagram showing the configuration of the imaging element 120 (directional sensor). The imaging element 120 has an image sensor 124 having a plurality of pixels composed of photoelectric conversion elements arrayed in two-dimensional directions (in a two-dimensional manner), and a microlens array MA1 provided on an incidence surface of the image sensor 124. One microlens ML1 composing the microlens array MA1 is provided for every nine pixels (see FIG. 4), and incident light is divided and made to be incident on the nine pixels by the microlens ML1.

Figure 4:
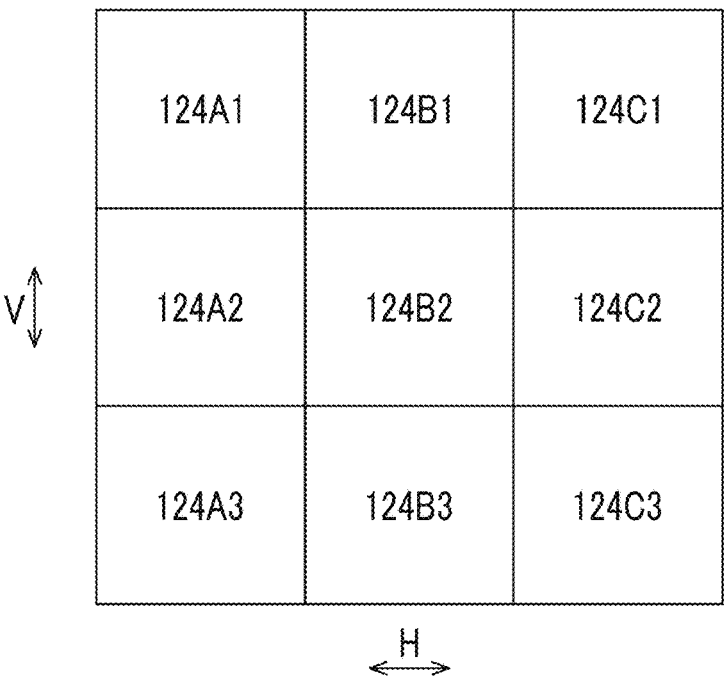
FIG. 4 is another diagram showing the configuration of the directional image sensor.

FIG. 4 is a diagram showing the arrangement of the pixels. In FIG. 4, an example of a case where one microlens ML1 (not shown in FIG. 4) is provided for nine pixels (pixels 124A1 to 124C3) in total of three pixels in a horizontal direction H and three pixels in a vertical direction V is shown. In FIG. 4, the nine pixels correspond to nine different azimuthal regions. For example, a pixel 124B2 is an azimuthal region with respect to the center region of the imaging range centering on a direction (front direction) perpendicular to the surfaces of the FZP and the image sensor 124. A color filter (for example, red, blue, or green) may be provided in each pixel of the imaging element 120 to acquire a color image. It is assumed that the "azimuthal region" means a three-dimensional region having spreads in the direction of the optical axis L and a direction perpendicular to the optical axis L (for example, the horizontal direction and the vertical direction) with respect to a specific azimuth (for example, an azimuth A, B, or C of FIG. 3).

It is possible to individually obtain a projection image corresponding to each azimuthal region based on a signal of a pixel corresponding to the same azimuthal region among all pixels of the imaging element 120. For example, it is possible to obtain a projection image corresponding to the above-described center region from a signal of the pixel 124B2.

In this way, the imaging element 120 is a directional sensor that receives the projection image of the FZP, divides the projection image into nine azimuthal regions with different directions, and acquires nine projection images corresponding to the nine divided azimuthal regions. In the imaging element 120, the number of pixels for one microlens ML1 is not limited to nine, and may be other numbers (for example, 16 pixels, 25 pixels, or the like).

<Configuration of Imaging Apparatus Body>

The imaging apparatus body 200 comprises an image processing unit 210 (restored image generation unit, composition processing unit, restoration processing unit, magnification unit, magnification ratio acquisition unit, and combined image generation unit), a storage unit 220 (storage unit), a display unit 230 (display unit), and an instruction input unit 240 (instruction input unit) (see FIG. 1), and performs image restoration of the subject, combination of the restored images, or the like based on the projection images acquired by the imaging module 100.

Figure 5:
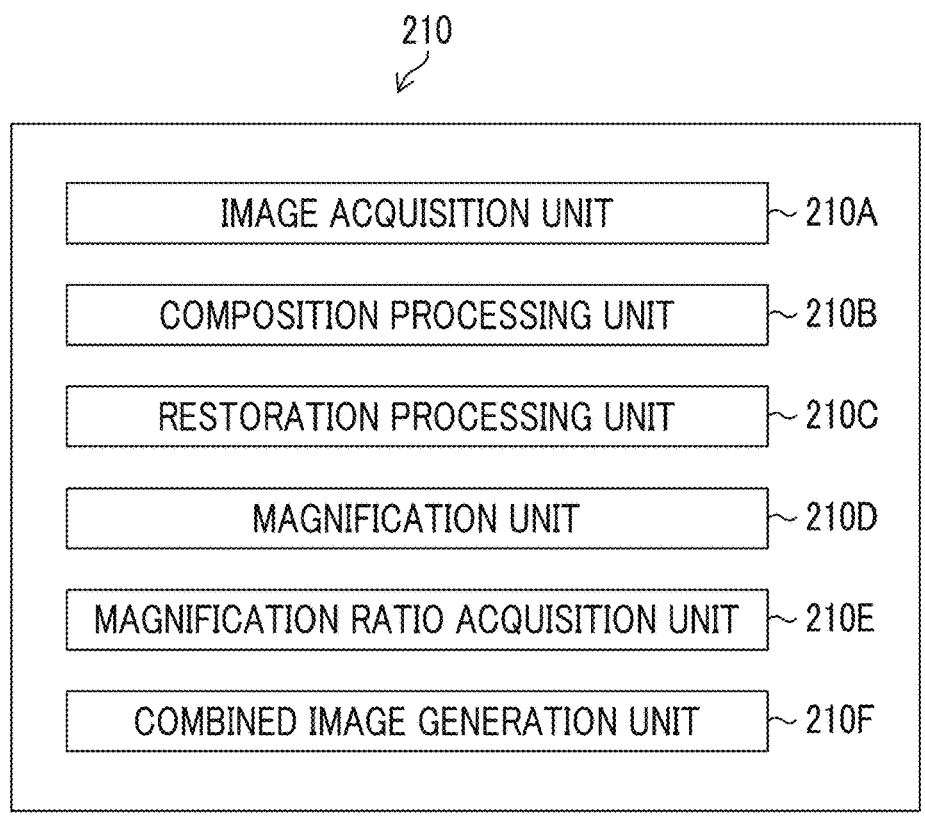
FIG. 5 is a diagram showing the functional configuration of an image processing unit.

FIG. 5 is a diagram showing the functional configuration of the image processing unit 210. The image processing unit 210 has an image acquisition unit 210A, a composition processing unit 210B (restored image generation unit), a restoration processing unit 210C (restored image generation unit), a magnification unit 210D, a magnification ratio acquisition unit 210E, and a combined image generation unit 210F. The image acquisition unit 210A acquires the projection image corresponding to each azimuthal region from a signal output from the imaging element 120, and the composition processing unit 210B superimposes the acquired projection image and the projection pattern corresponding to the FZP. Then, the restoration processing unit 210C performs two-dimensional Fourier transform on a plurality of moire fringes formed by superimposition, and restores and generates a plurality of images corresponding to different azimuthal regions. The magnification unit 210D reads a plurality of projection patterns stored in the storage unit 220 (see FIG. 1) and magnifies a plurality of projection patterns at a necessary magnification ratio, and the composition processing unit 210B performs the above-described superimposition with the magnified projection patterns. In magnifying the projection patterns, the magnification ratio acquisition unit 210E acquires a magnification ratio, at which resolution of an image restored by the restoration processing unit 210C becomes maximum, automatically (without depending on an instruction input of a user). The combined image generation unit 210F combines a plurality of images restored by the restoration processing unit 210C to generate one image.

Hardware structures for implementing the functions of the image processing unit 210 described above are various processors described below. Various processors include a central processing unit (CPU) that is a general-purpose processor executing software (program) to function as the image processing unit 210, a programmable logic device (PLD) that is a processor capable of changing a circuit configuration after manufacturing, such as a field programmable gate array (FPGA), a dedicated electric circuit that is a processor having a circuit configuration dedicatedly designed to execute specific processing, such as an application specific integrated circuit (ASIC), and the like.

Each function of the image processing unit 210 may be composed of one of various processors or may be composed of two or more processors of the same type or different types (for example, a plurality of FPGAs or a combination of a CPU and an FPGA). A plurality of functions may be composed of one processor. As an example where a plurality of functions are composed of one processor, first, there is a form in which one processor is composed of a combination of one or more CPUs and software so as to be represented by a computer, such as a client or a server, and the processor implements a plurality of functions. Second, there is a form in which a processor for implementing all functions of the image processing unit 210 with one integrated circuit (IC) chip so as to be represented by system on chip (SoC) or the like. In this way, each function of the image processing unit 210 is composed of one or more of various processors as a hardware structure.

More specifically, the hardware structures of various processors are electric circuits (circuitry) in which circuit elements, such as semiconductor elements, are combined.

When the above-described processor (or the electric circuit) executes software (program), a processor-readable code of software to be executed is stored in, for example, a non-transitory recording medium, such as a read only memory (ROM), and the processor refers to software. In processing using software, for example, a random access memory (RAM) is used as a temporary storage area, and data stored in an electronically erasable and programmable read only memory (EEPROM) is referred to.

The display unit 230 is composed of a display device, such as a liquid crystal device (not shown), and displays an image restored by the restoration processing unit 210C and/or an image generated by the combined image generation unit 210F. The display unit 230 is also used in screen display for a user interface (UI) at the time of an instruction input through the instruction input unit 240. The instruction input unit 240 is composed of devices, such as a keyboard and a mouse (not shown), and the user can input conditions of a magnification ratio of a projection pattern, a subject distance, and the like using these devices. The display device of the display unit 230 may be composed of a touch panel, and the display unit 230 may be used as the instruction input unit 240 in addition to image display.

<Generation of Restored Image>

Figure 6:
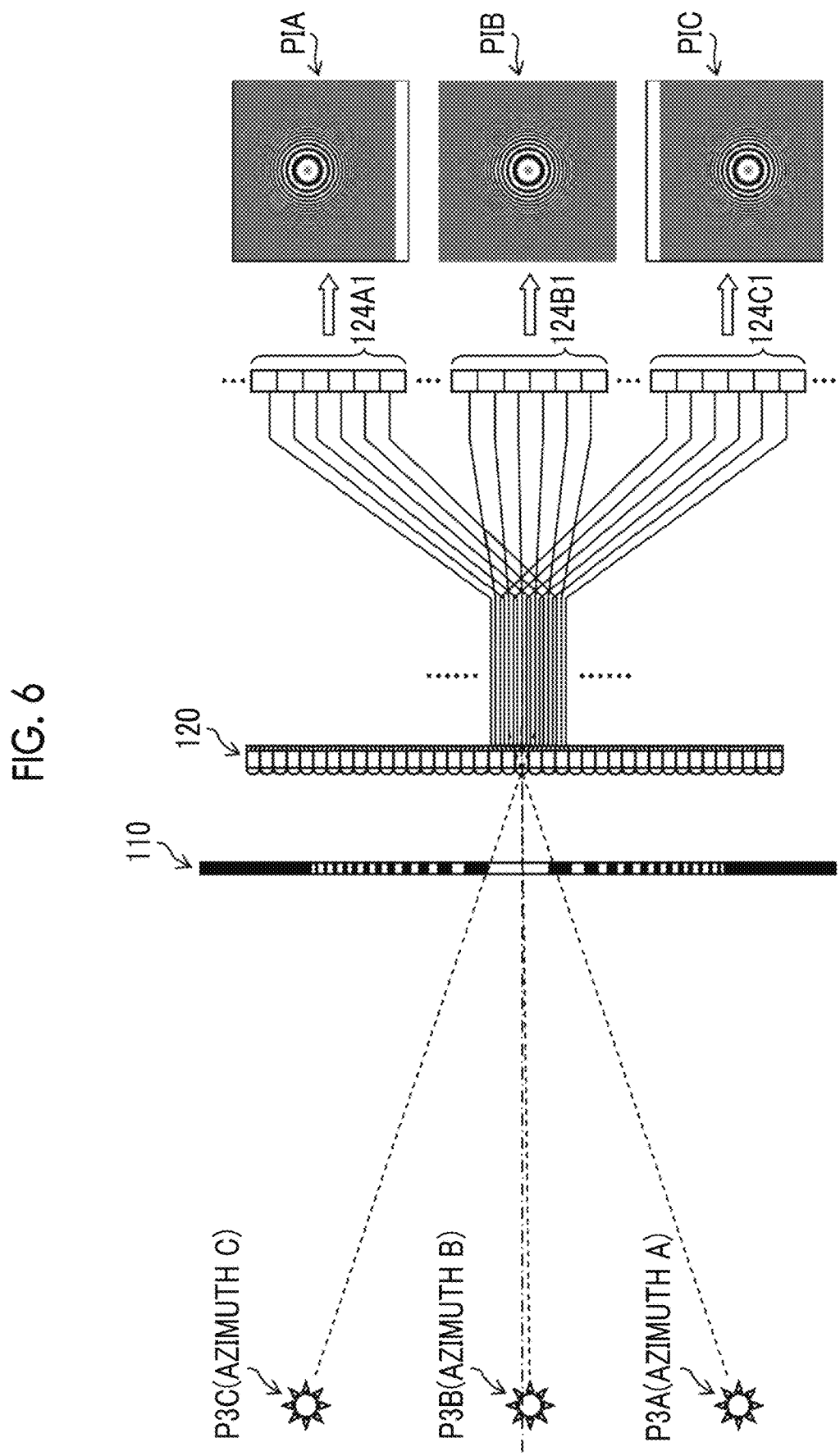
FIG. 6 is a diagram showing an aspect in which projection images of respective directions are acquired individually.

Next, the outline of restored image generation processing in the imaging apparatus 10 having the above-described configuration will be described. FIG. 6 is a diagram showing an aspect of projection image acquisition. In the following description, although three azimuthal regions centering on azimuths A, B, and C (directions in which point light sources P3A, P3B, and P3C are present) within the paper of FIG. 6 will be described, since the projection images are acquired for the three azimuthal regions perpendicular to the paper as described above, the number of azimuthal regions where the projection images are acquired becomes nine in total.

Figure 7:
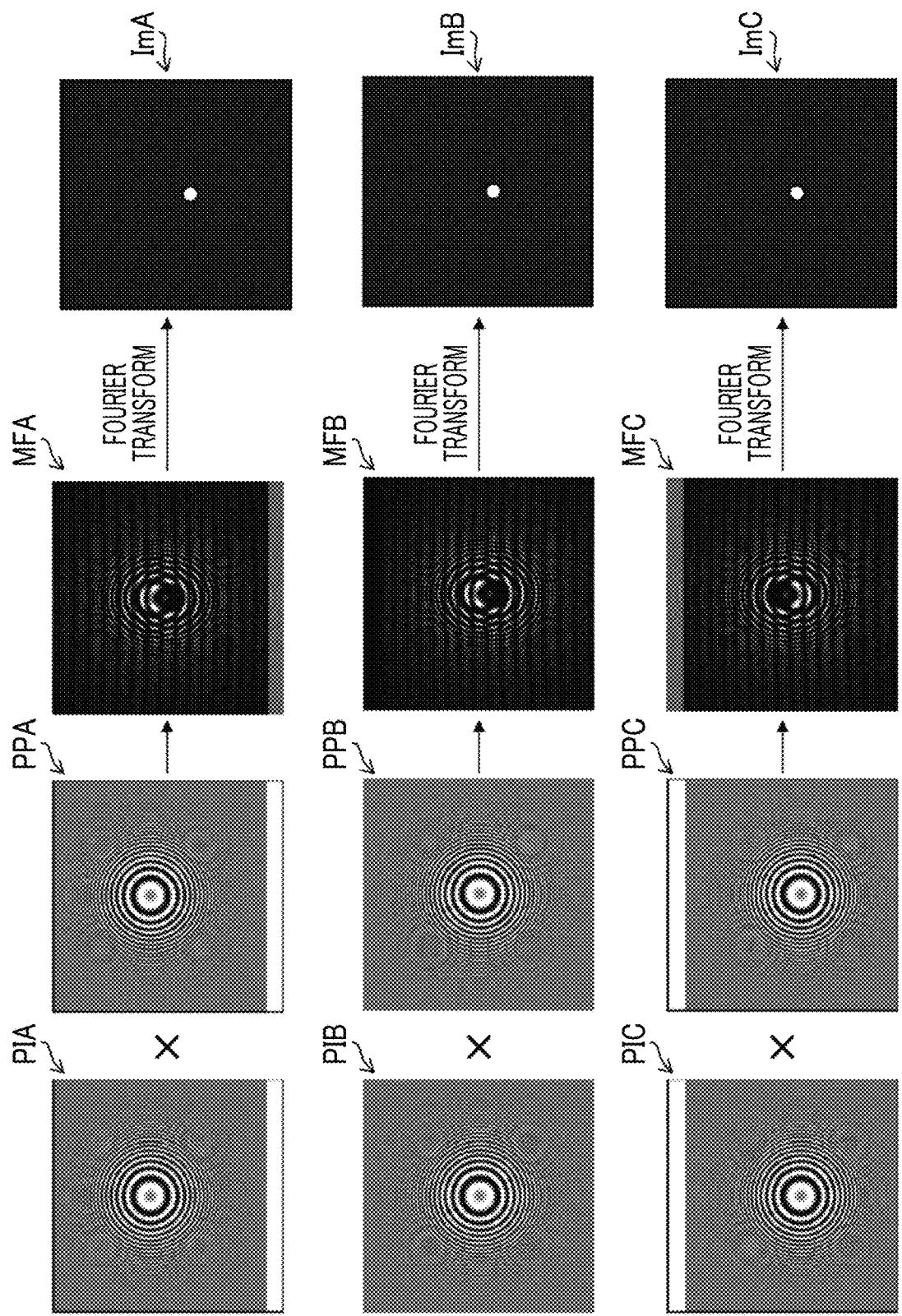
FIGS. 7A to 7C are diagrams showing an aspect in which a restored image of each direction is acquired individually.

First, the image acquisition unit 210A individually acquires projection images PIA, PIB, and PIC of the FZP corresponding to the azimuthal regions from the signals of the pixels (for example, the pixels 124A1, 124B1, and 124C1 of FIG. 4) corresponding to the azimuthal regions. FIGS. 7A to 7C are diagrams showing an aspect in which the images (the images of the point light sources P3A, P3B, and P3C) corresponding to the azimuthal regions are generated based on the acquired projection images PIA, PIB, and PIC. Specifically, FIG. 7A shows an aspect in which the composition processing unit 210B superimposes the projection image PIA for the azimuth A and a projection pattern PPA corresponding to the projection image PIA through image processing, and the restoration processing unit 210C performs two-dimensional Fourier transform on an image MFA of obtained moire fringes to restore an image ImA of the point light source P3A. Since the image processing of the superimposition is executed through addition, a calculation load is small. In the superimposition, the projection pattern corresponding to the FZP is shifted according to the direction of the azimuth A (see FIG. 9). Similarly, FIG. 7B shows an aspect in which the composition processing unit 210B superimposes the projection image PIB for the azimuth B and a projection pattern PPB corresponding to the projection image PIB, and the restoration processing unit 210C performs two-dimensional Fourier transform on an image MFB of obtained moire fringes to restore an image ImB of the point light source P3B. FIG. 7C shows an aspect in which the composition processing unit 210B superimposes the projection image PIC for the azimuth C and a projection pattern PPC corresponding to the projection image PIC, and the restoration processing unit 210C performs two-dimensional Fourier transform on an image MFC of obtained moire fringes to restore an image ImC of the point light source P3C.

In this way, in the imaging apparatus 10 according to the first embodiment, since incident light is divided into the three azimuthal regions by the imaging element 120 as a directional sensor, and the images ImA, ImB, and ImC of the subject corresponding to the azimuthal regions are restored from the projection images PIA, PIB, and PIC individually acquired corresponding to the azimuthal regions, incident light from the oblique directions (azimuths A and C) does not become noise to incident light from the front direction (azimuth B), and the projection images PIA, PIB, and PIC can be acquired for the azimuthal regions at a wide angle of view throughout the front direction and the oblique directions (azimuths A to C). For this reason, restoration processing (the two-dimensional Fourier transform of the moire fringes obtained by the superimposition of the projection images and the projection patterns) according to the properties of the FZP as a pattern mask and the projection images is executed, whereby high image quality restored images (images ImA, ImB, and ImC) can be individually obtained for a plurality of different directions (azimuthal regions) at a wide angle of view without using a lens. The same applies to other six azimuthal regions, and nine restored images in total can be obtained. A normal subject (character, scenery, still life, or the like) can be ascertained as a set of point light sources, and in a case where a restored image for such a normal subject is generated, there are a plurality of point light sources in the restored image of each direction depending on the configuration of the subject.

<Generation of Combined Image>

Figure 8:
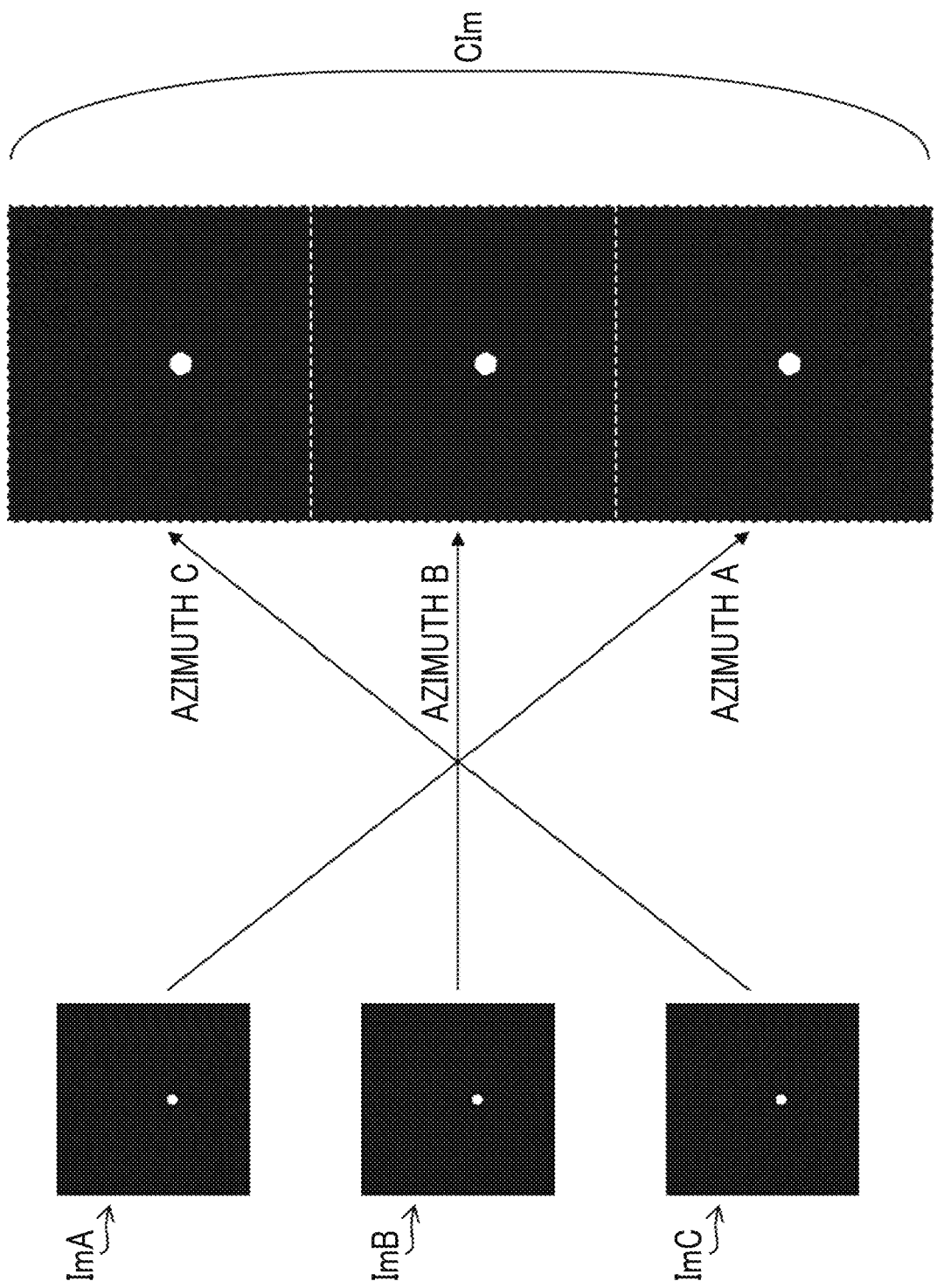
FIG. 8 is a diagram showing an aspect in which the restored images of the respective directions are combined to generate one image.

After the images ImA, ImB, and ImC are restored, the combined image generation unit 210F combines these images as shown in FIG. 8 to generate one image CIm. In the first embodiment, while the nine restored images in total are generated for the nine azimuthal regions, all of these restored images may be combined or only a part of the restored images may be combined. Alternatively, a plurality of images in which restored images with different combinations of the azimuthal regions are combined may be generated. In a case where all restored images are combined, one image for all azimuthal regions is obtained. In a case where a part of restored images is combined, an image for a desired azimuthal region is obtained.

<Respective Processing of Restored Image Generation>

Next, respective processing of restored image generation described above will be described.

<Shift of Projection Pattern according to Azimuthal Region>

Figure 9:
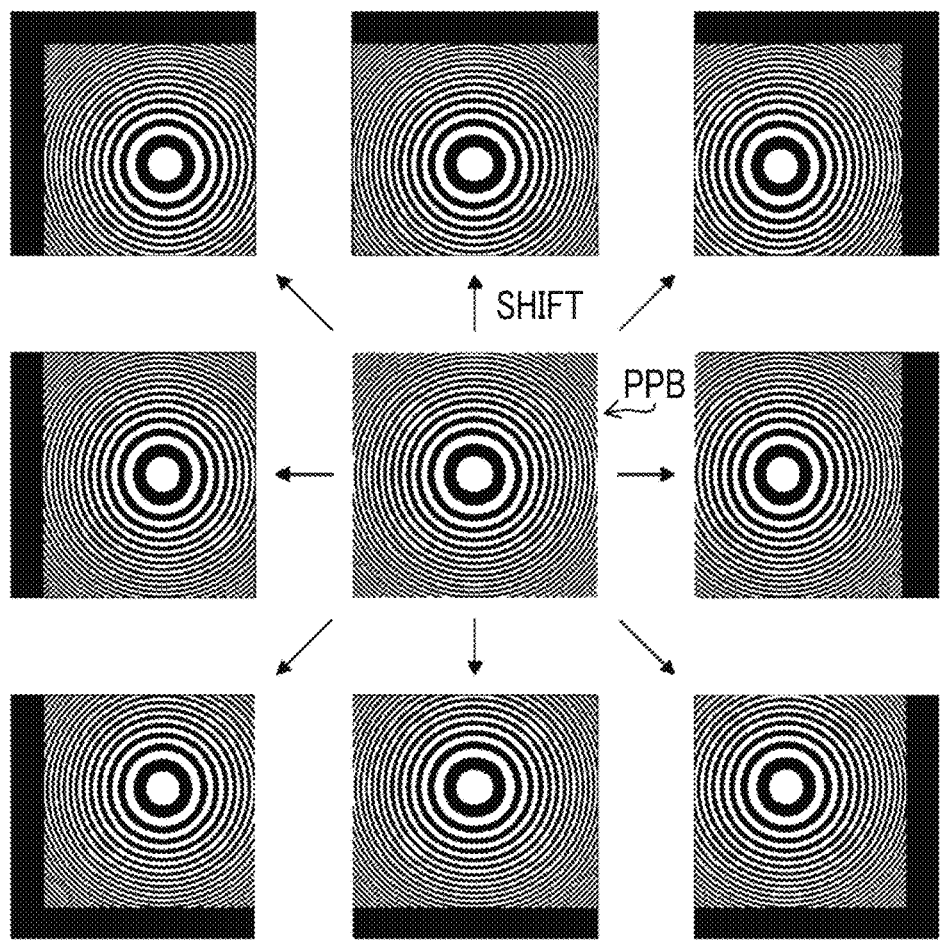
FIG. 9 is a diagram showing an aspect in which a projection pattern is shifted according to an azimuthal region.

In the image restoration described above, the composition processing unit 210B superimposes the projection patterns PPA and PPC shifted according to the directions of these azimuthal regions on the projection images for the azimuthal regions (corresponding to the azimuths A and C) of the oblique directions, and superimposes the unshifted projection pattern PPB (the projection pattern corresponding to the FZP) on the projection image for the azimuthal region (corresponding to the azimuth B) including the center region of the imaging range. FIG. 9 is a conceptual diagram showing shift of a projection pattern, and shows an aspect in which the projection pattern PPB (unshifted) corresponding to the FZP is shifted according to the directions of the eight azimuthal regions. The projection image on the imaging element 120 is formed at different positions according to the directions of the subject (the directions of the azimuthal regions), and the projection pattern is also shifted corresponding to the projection image, whereby it is possible to obtain a high image quality restored image.

<Magnification of Projection Pattern according to Subject Distance>

Figure 10:
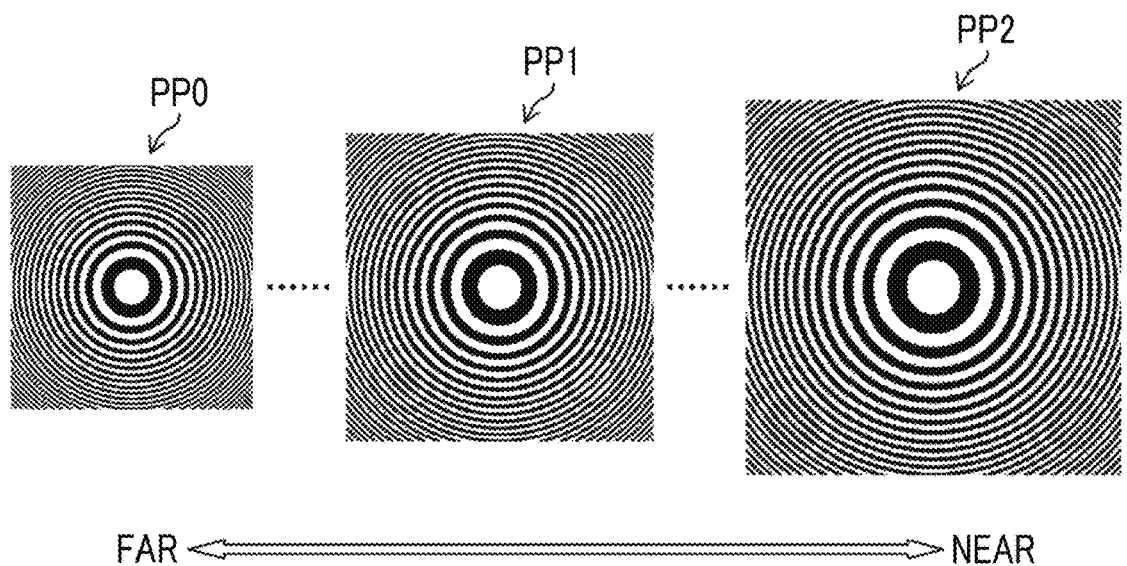
FIG. 10 is a diagram showing an aspect in which a projection pattern is magnified according to a subject distance.

In a case where the subject distance is infinity, since parallel light is incident from the subject and the projection image becomes the same size of the FZP, there is no need to magnify the projection pattern to be superimposed on the projection image. However, since light having a spread is incident when the distance becomes shorter and the number of projection images increases, there is a need to also magnify the projection pattern to be superimposed on the projection image. FIG. 10 is a conceptual diagram showing magnification of a projection pattern according to a subject distance in the magnification unit 210D. FIG. 10 shows an aspect in which, in a case where the subject distance is infinity, a projection pattern PP0 having the same size as the FZP is used, and the projection pattern is magnified when the subject distance becomes shorter (in a case of a middle distance, a projection pattern PP1 is used, and in a case of a close distance, a projection pattern PP2 is used). In this way, the projection pattern is magnified according to the subject distance, whereby it is possible to adjust a focusing state of a restored image.

In the magnification of the projection pattern described above, the user may manually instruct and input the magnification ratio or the subject distance through the instruction input unit 240, or the magnification ratio acquisition unit 210E may automatically acquire the magnification ratio at which the resolution of the restored image becomes maximum. The magnification unit 210D reads and magnifies a plurality of projection patterns from the storage unit 220 based on the magnification ratio or the subject distance acquired manually or automatically, and the composition processing unit 210B superimposes the magnified projection patterns on the projection images. In a case where the magnification ratio or the subject distance is manually input, the magnification may be performed while displaying the restored image generated at the input magnification ratio or subject distance on the display unit 230. With this, the user can adjust the magnification ratio or the subject distance while viewing the restored image and can obtain a restored image in a desired focusing state.

The magnification ratio or the subject distance of the projection image to be superimposed may be constant without depending on the azimuthal regions, or may have different values depending on the azimuthal regions. The magnification ratio or the subject distance is changed depending on the azimuthal regions, whereby it is possible to obtain a restored image in which a focusing state for a desired azimuthal region is different from a focusing state for other azimuthal regions. As such a restored image, for example, a restored image that is focused in the front direction and is intentionally blurred in other directions is considered.

<Storage of Projection Pattern according to Azimuthal Region and Subject Distance>

Figure 11:
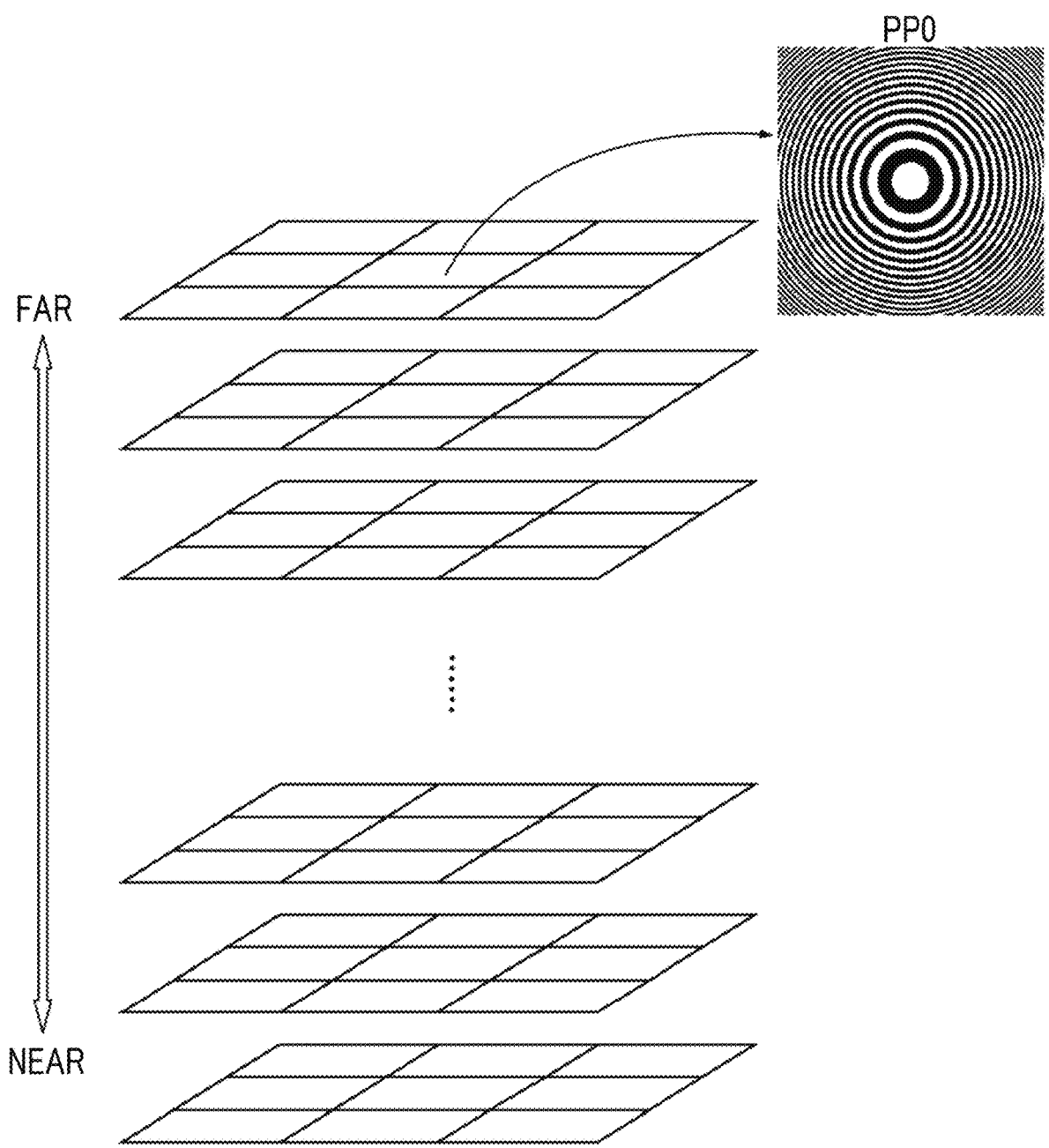
FIG. 11 is a diagram showing an aspect in which a projection pattern is stored according to an azimuthal region and a subject distance.
Figure 12:
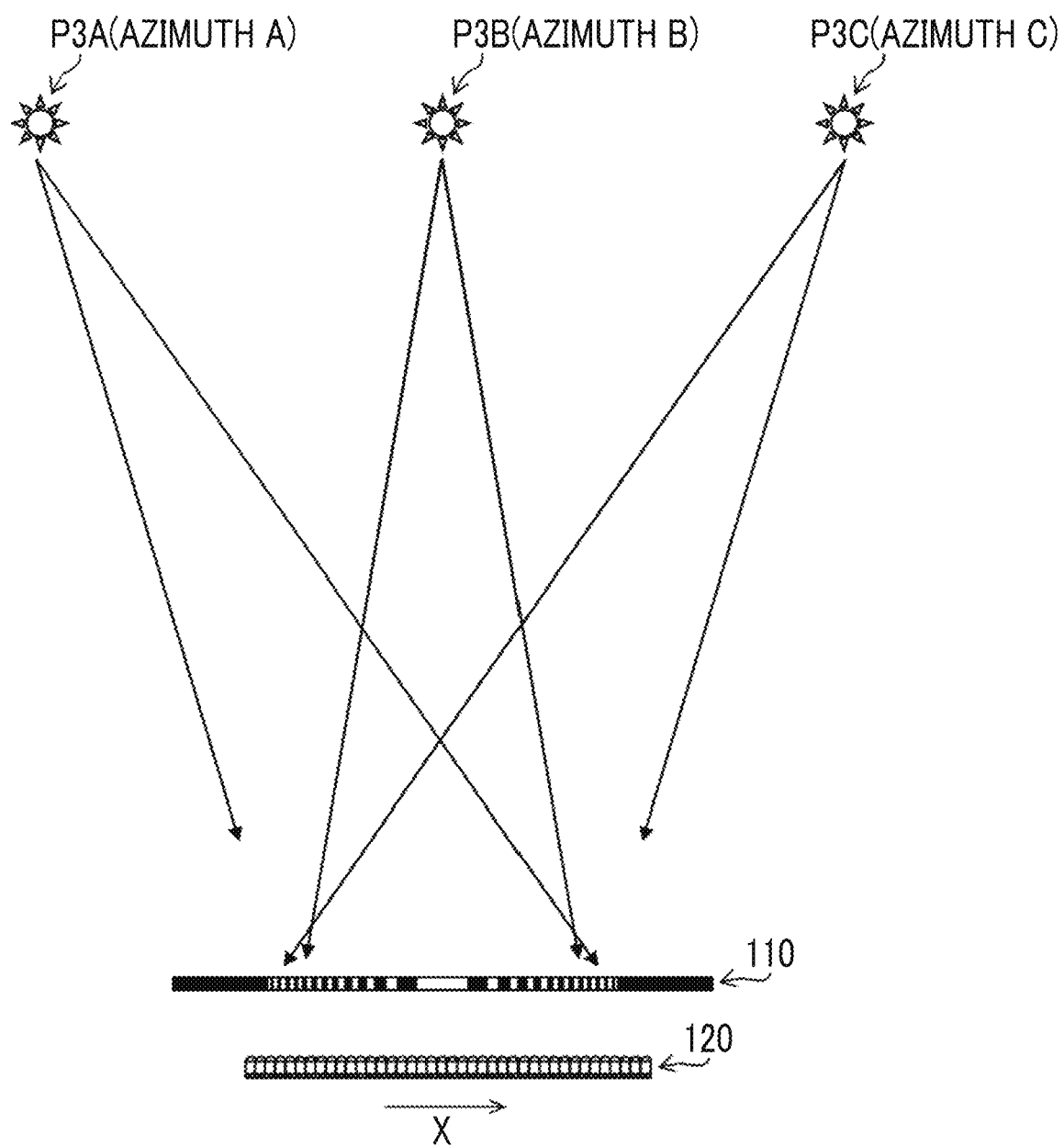
FIG. 12 is a diagram showing an aspect in which light is incident from a front direction and oblique directions in the imaging apparatus according to the first embodiment.

In the imaging apparatus 10 according to the first embodiment, in order to perform the magnification of the projection pattern described above, a plurality of projection patterns with different magnification ratios according to the subject distance are stored in the storage unit 220. FIG. 11 is a conceptual diagram showing an aspect in which the projection patterns are stored. In FIG. 11, one frame represents one projection pattern, and nine projection patterns present on the same plane indicate the projection patterns composed of the projection patterns (see FIG. 9) shifted according to the azimuthal regions. In the imaging apparatus 10 according to the first embodiment, since a plurality of projection patterns with different magnification ratios according to the subject distance are stored, it is possible to reduce a load of processing compared to a case where one kind of projection pattern is magnified according to the distance.

In the first embodiment, although an aspect (see FIG. 11) in which a plurality of projection patterns with different magnification ratios according to the subject distance are stored has been described, in a case where reduction in storage capacity is emphasized, one kind or a small number of projection patterns corresponding to a specific distance may be stored and magnified according to the distance.

<Effects of First Embodiment>

Figure 13A:
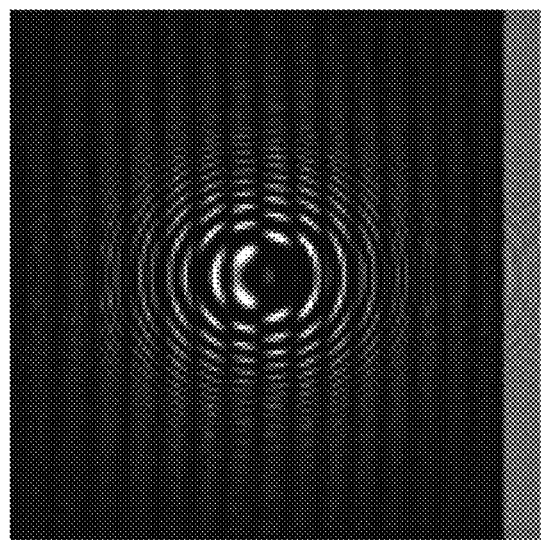
FIGS. 13A to 13C are diagrams showing moire fringes in a situation shown in FIG. 12.
Figure 13B:
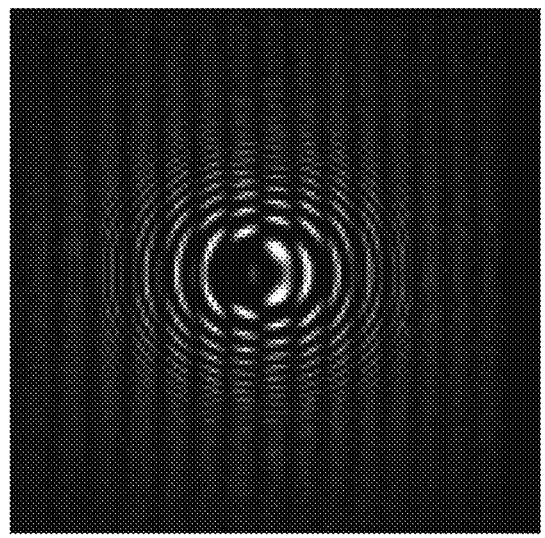
Figure 13C:
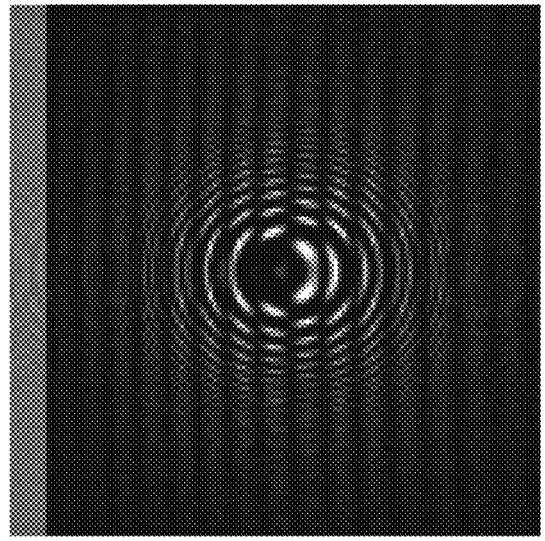
Figure 14A:
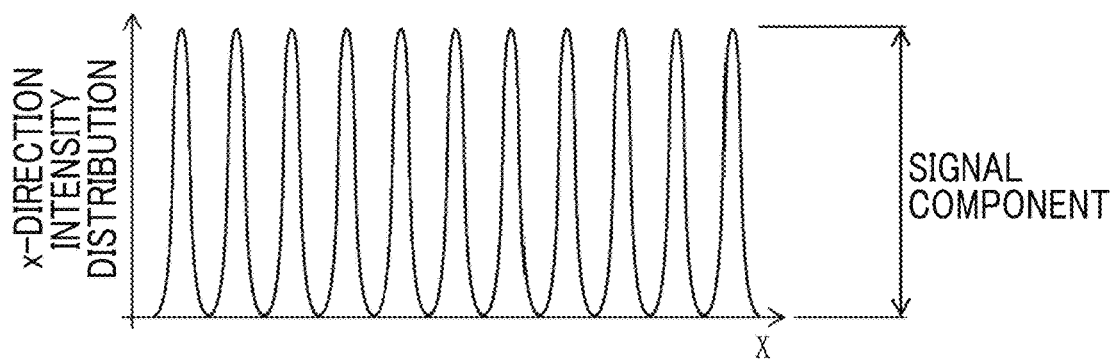
FIGS. 14A to 14C are diagrams showing a signal intensity distribution of each direction in the situation shown in FIG. 12.
Figure 14B:
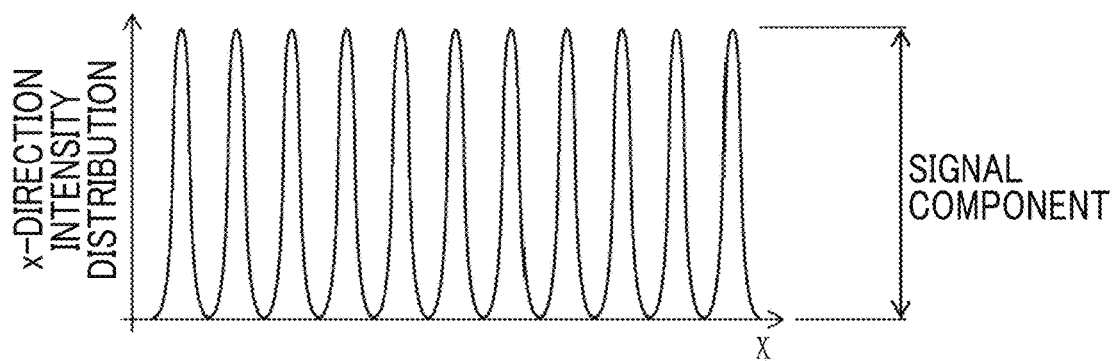
Figure 14C:
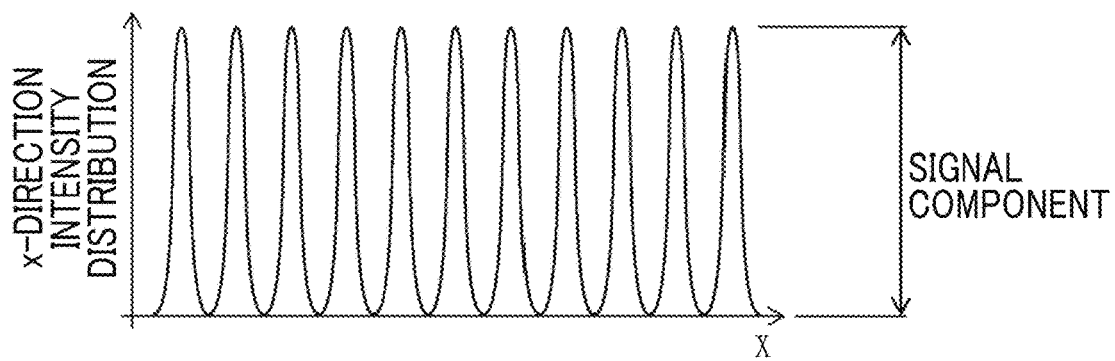

The effects of the imaging apparatus 10 (imaging apparatus and imaging module) having the above-described configuration will be described referring to FIGS. 12 to 14C. As in FIG. 12, in a situation in which light is incident from the front direction and the oblique directions (azimuths A to C), incident light is divided into the azimuthal regions with the imaging element 120 as a directional sensor in the imaging apparatus 10 and the projection images are individually acquired. For this reason, as shown in FIG. 13A to 13C, the moire fringes (as shown in FIGS. 14A to 14C, a difference in signal intensity is large in bright and dark portions, and is recognizable as a fringe) observable for the respective directions occur, and restored images can be generated from the moire fringes. That is, unlike "Development of lensless camera technology for adjusting focus after video imaging", [online], Nov. 15, 2016, Hitachi, Ltd., [Searched on Dec. 15, 2016], Internet (http://www.hitachi.co.jp/New/cnews/month/2016/11/1115.html) and "New technology for capturing image with no lens "FlatCam"", [online], Nov. 25, 2015, ASCII. JP, [Searched on Dec. 13, 2016], Internet (http://ascii.jp/elem/000/001/083/1083322/) described above, incident light from the oblique direction does not become a bias component with respect to incident light from the front direction, and high image quality images can be acquired at a wide angle of view. FIGS. 13A, 13B, and 13C show moire fringes that are formed with light incident from the azimuth A, the azimuth B, and the azimuth C, respectively, and FIGS. 14A, 14B, and 14C show signal intensity distributions corresponding to FIGS. 13A, 13B, and 13C, respectively.

Another Example of Directional Sensor

Figure 15:
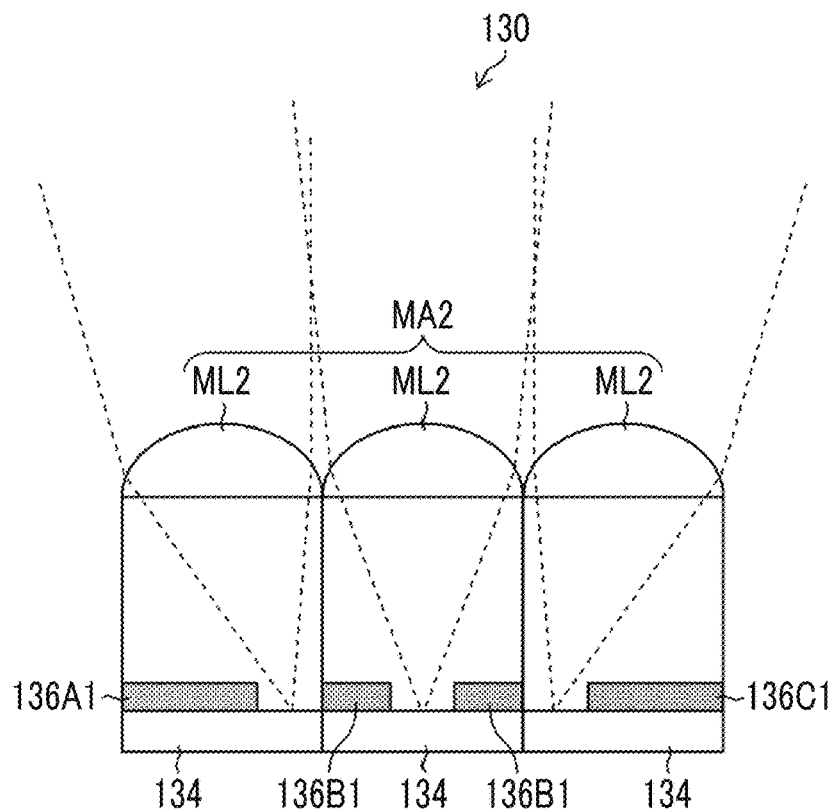
FIG. 15 is a diagram showing another example of the directional image sensor.
Figure 16:
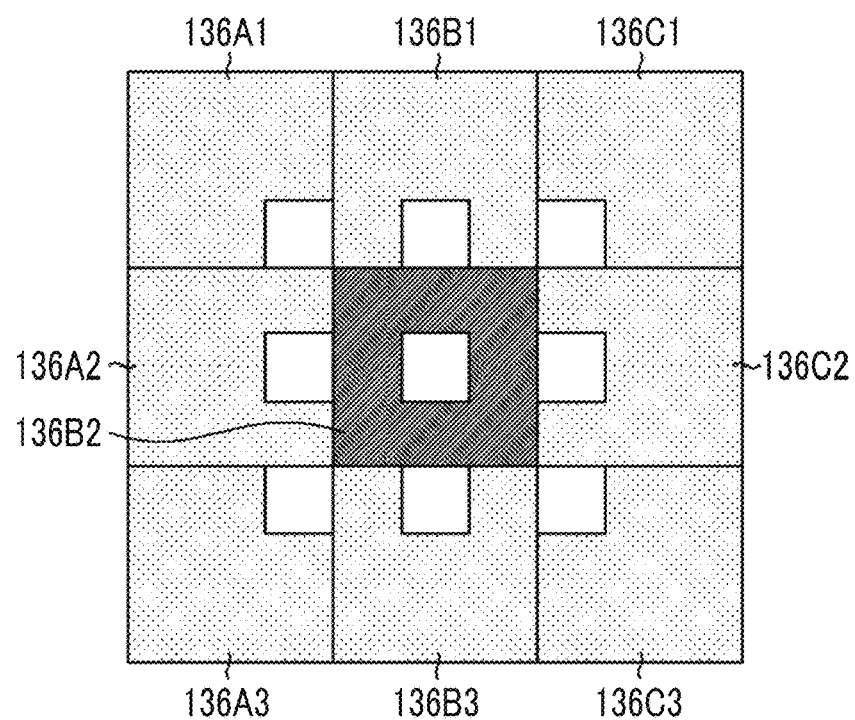
FIG. 16 is a diagram showing the arrangement of the directional image sensor shown in FIG. 15.

FIG. 15 is a diagram showing another example of the directional sensor in the imaging apparatus and the imaging module of the invention. In the example shown in FIG. 15, microlenses ML2 (microlenses composing a microlens array MA2) are provided in respective pixels in an imaging element 130 (directional sensor), and a plurality of kinds of light shielding masks 136A1 to 136C1 in which openings with different directions corresponding to the azimuthal regions are formed are provided between the pixels of the image sensors 134 and the microlenses ML2. In FIG. 15, although pixels corresponding to three azimuthal regions within the paper are shown, pixels are provided even in the vertical direction to the paper. FIG. 16 is a diagram showing an arrangement example of light shielding masks, and shows a state in which light shielding masks 136A1 to 136C3 corresponding to nine azimuthal regions are arranged in the same density (one for each of the nine pixels). In FIG. 16, a meshed portion indicates a light shielding mask, and an unmeshed portion indicates an opening. The light shielding mask 136B2 corresponding to the front direction is displayed in a meshed state different from other directions.

Figure 17:
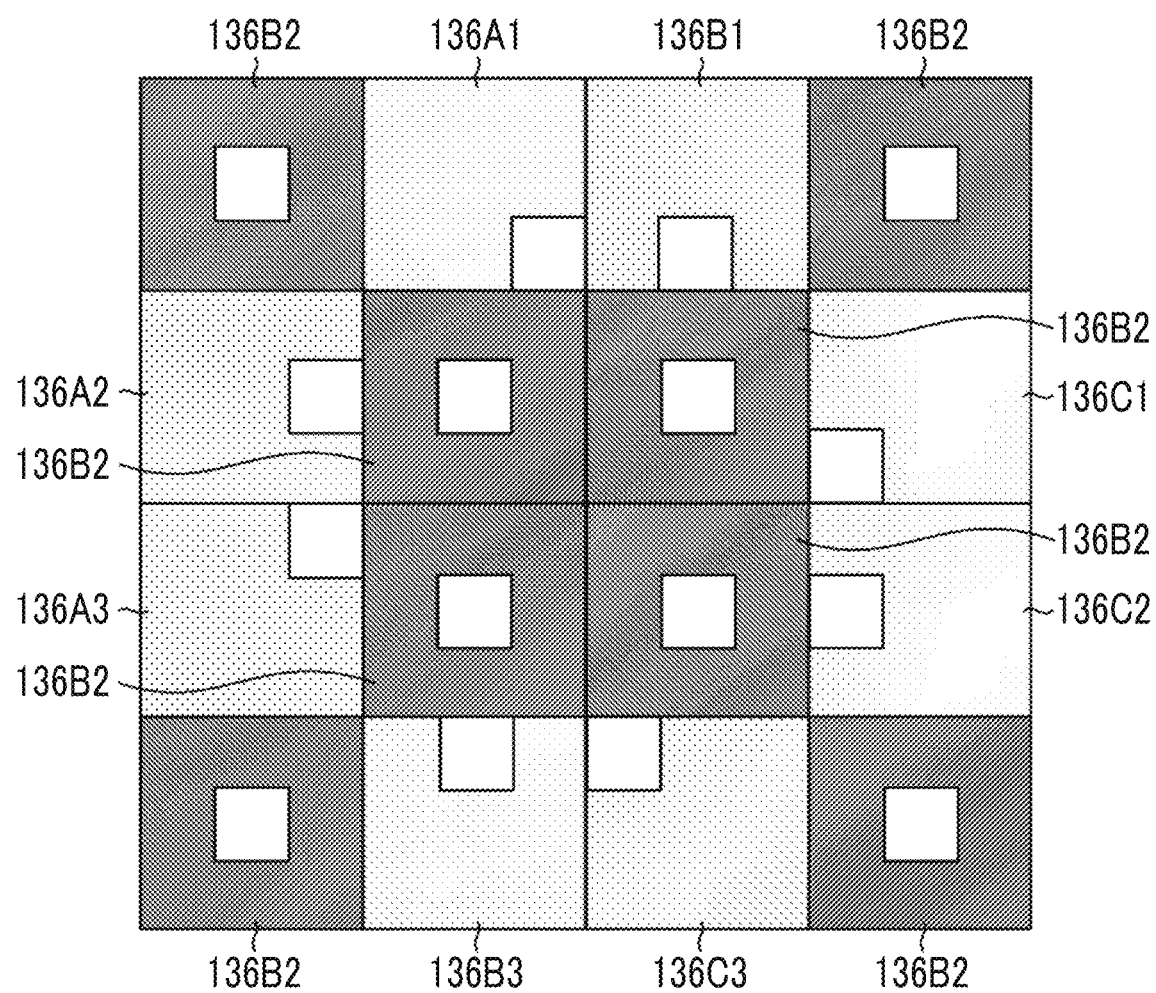
FIG. 17 is a diagram showing another arrangement of the directional image sensor shown in FIG. 15.
Figure 18:
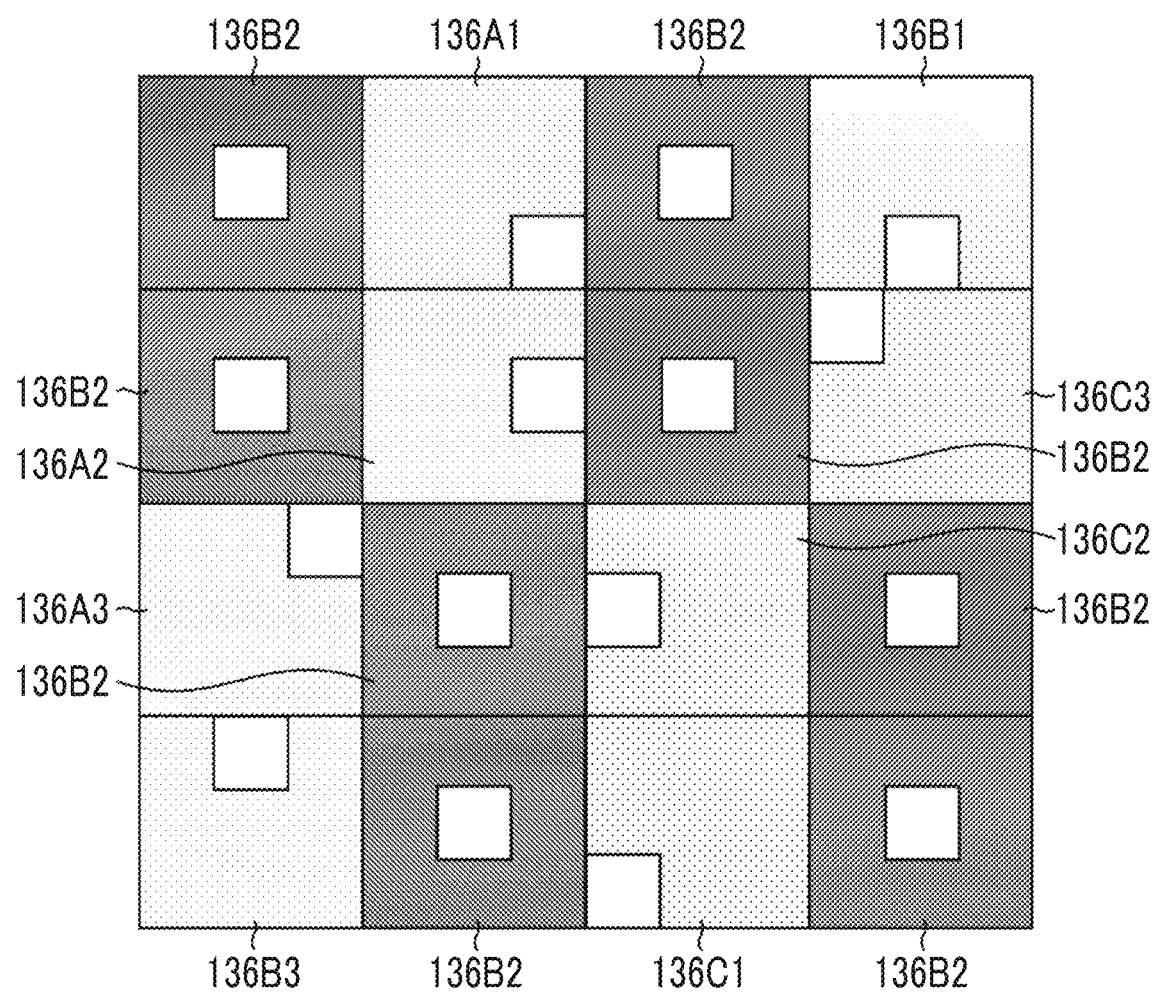
FIG. 18 is a diagram showing still another arrangement of the directional image sensor shown in FIG. 15.

FIG. 17 is a diagram showing another arrangement example of light shielding masks, and shows a state in which light shielding masks 136A1 to 136C3 corresponding to nine azimuthal regions are arranged in different densities. In the example, since the light shielding masks 136B2 corresponding to the front direction are arranged in a high density (eight for 16 pixels), it is possible to increase the image quality of the restored images of the front direction. In a basic array pattern composed of 16 pixels, the light shielding masks 136B2 for the front direction are arranged in all of four pixels in the vertical, horizontal, and oblique directions (diagonal directions). FIG. 18 shows still another example of the arrangement of the light shielding masks, and shows a state in which light shielding masks 136A1 to 136C3 corresponding to nine azimuthal regions are arranged in different densities. In the arrangement example of FIG. 18, while the light shielding masks corresponding to the front direction are arranged in a high density as in FIG. 17, an arrangement pattern is different from that in FIG. 17. Specifically, since the two light shielding masks 136B2 for the front direction are arranged in all of four pixels in the vertical, horizontal, and oblique directions (diagonal directions) in a basic array pattern composed of 16 pixels, and the arrangement of the light shielding masks for different directions in the basic array pattern is uniform, there is little deterioration of image quality in a specific direction.

In a case where the light shielding masks are arranged, a plurality of the patterns shown in FIGS. 16 to 18 or other different patterns may be combined. The number of pixels composing the basic array pattern is not limited to nine pixels and 16 pixels. As in FIGS. 17 and 18, the density of the light shielding masks for other directions may be increased, instead of increasing the density of the light shielding masks 136B2 for the front directions. For example, in a side view type imaging apparatus, it is considered that the density of the light shielding masks for the oblique direction is increased. A color filter (for example, red, blue, or green) may be provided in each pixel of the imaging element 130 to acquire a color restored image.

Another Example 1 of Imaging Apparatus and Imaging Module

Figure 19:
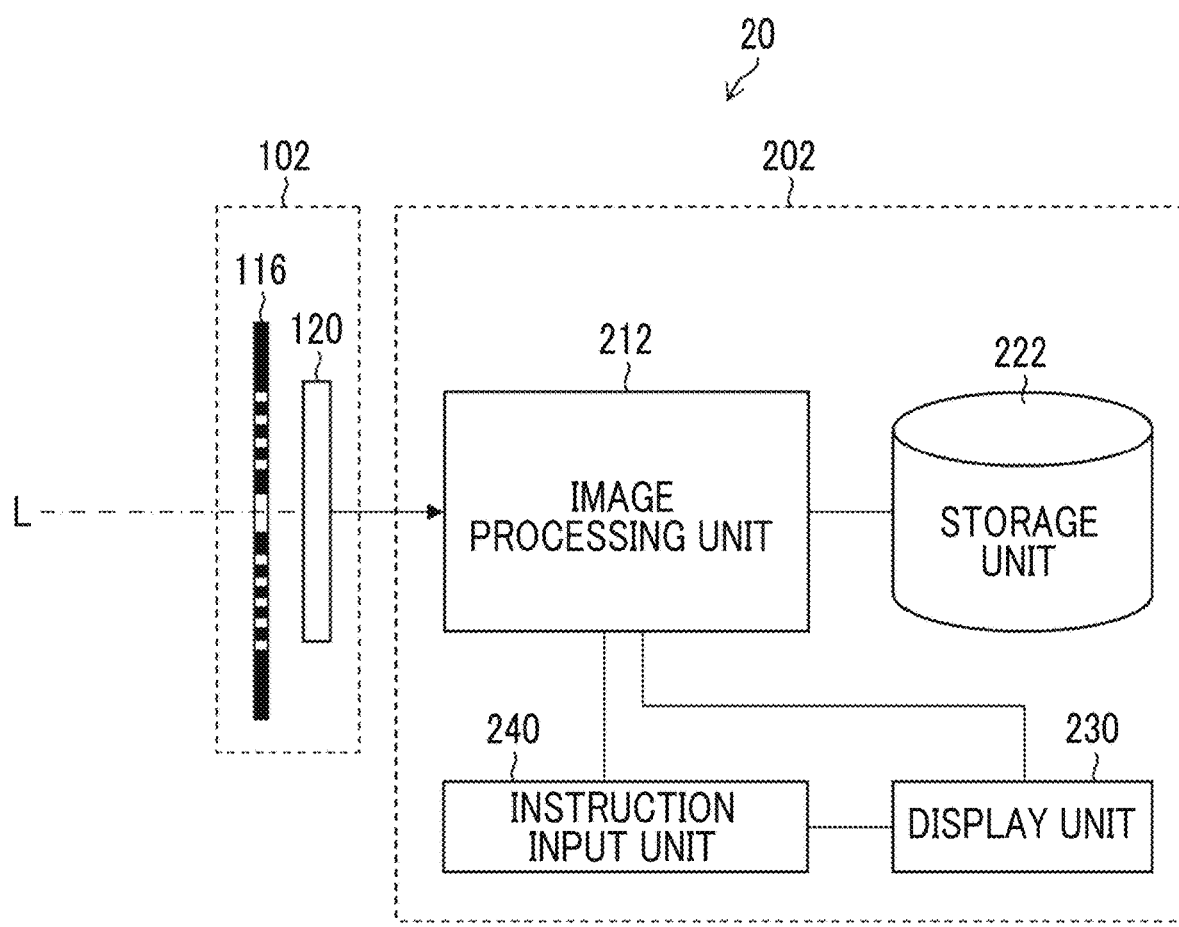
FIG. 19 is a diagram showing another example of an imaging apparatus and an imaging module.
Figure 20:
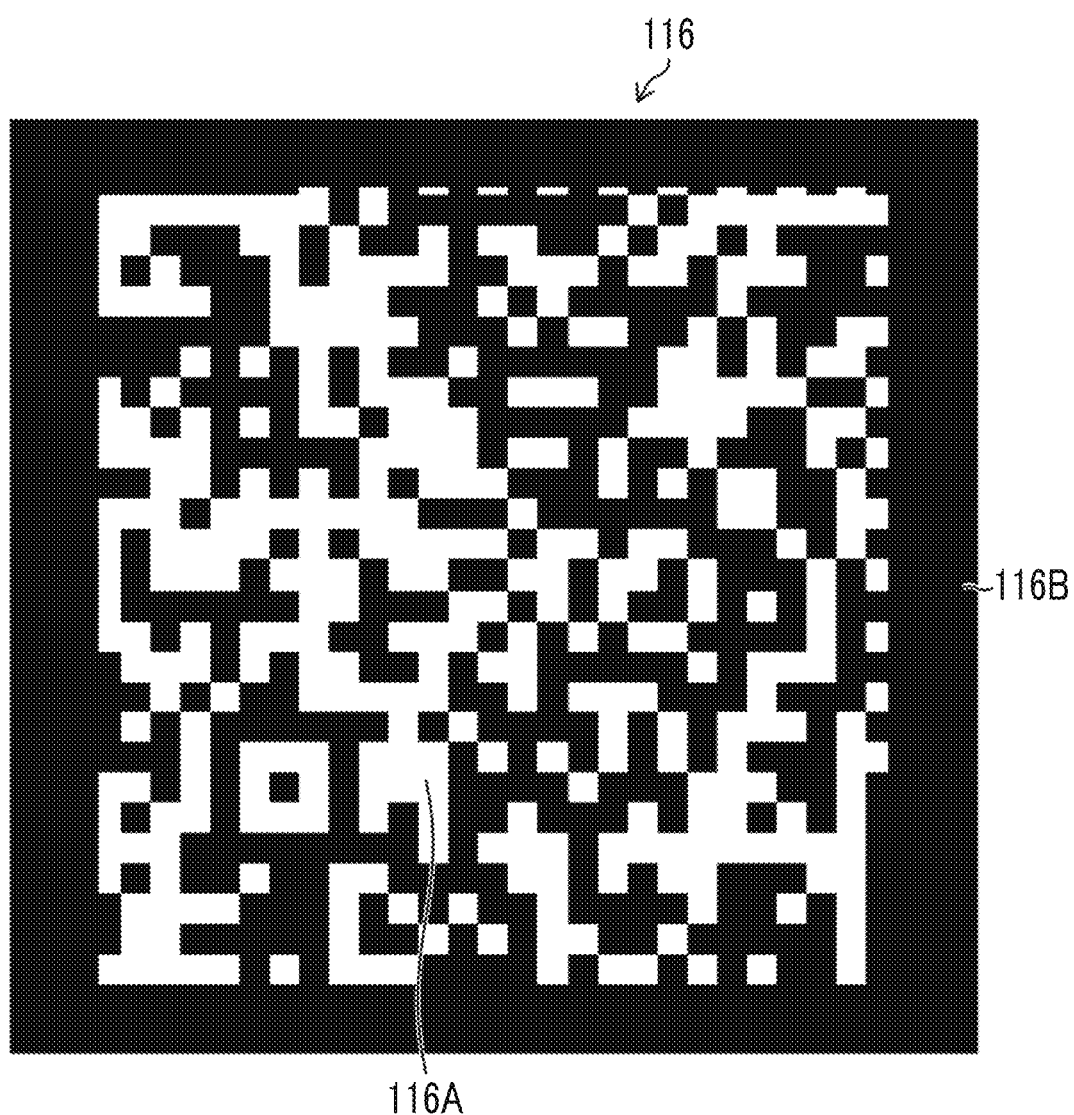
FIG. 20 is a diagram showing an example of an encoded pattern mask.

In the above-described first embodiment, although a case where the pattern masks compose the Fresnel zone plate has been described, in the imaging apparatus and the imaging module according to the invention, other different pattern masks may be used. FIG. 19 is a diagram showing another example 1 of the imaging apparatus and the imaging module, and shows an imaging apparatus 20 (imaging apparatus) composed of an imaging module 102 (imaging module) and an imaging apparatus body 202. The imaging module 102 comprises an encoded pattern mask 116 (pattern mask) and an imaging element 120 (directional sensor). As shown in FIG. 20, the encoded pattern mask 116 is composed of an encoded pattern portion 116A and a peripheral light shielding portion 116B, and information indicating a property of an arrangement pattern of a transmissive region and a light shielding region in the encoded pattern portion 116A is stored in the storage unit 222. Even in the imaging apparatus 20 having such a configuration, incident light from the subject is divided into a plurality of azimuthal regions by the imaging element 120, and the projection images corresponding to the azimuthal regions can be acquired. The image processing unit 212 executes restoration processing according to the properties of the encoded pattern and the projection images, whereby it is possible to individually obtain high image quality restored images for a plurality of different directions (azimuthal regions) at a wide angle of view without using a lens. In FIGS. 19 and 20, the same configurations as those in FIG. 1 are represented by the same reference numerals, and detailed description thereof will not be repeated.

Another Example 2 of Imaging Apparatus and Imaging Module

Figure 21:
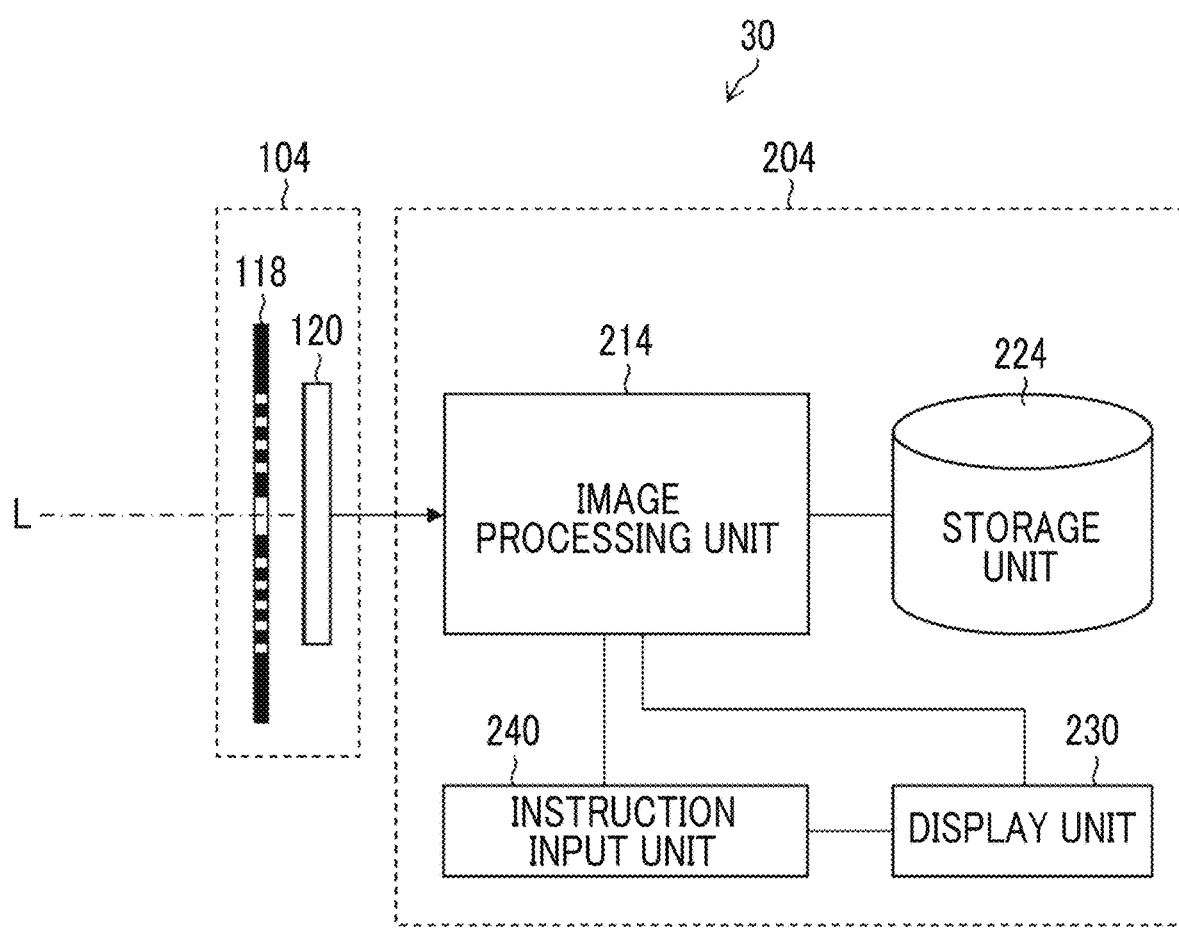
FIG. 21 is a diagram showing still another example of an imaging apparatus and an imaging module.
Figure 22:
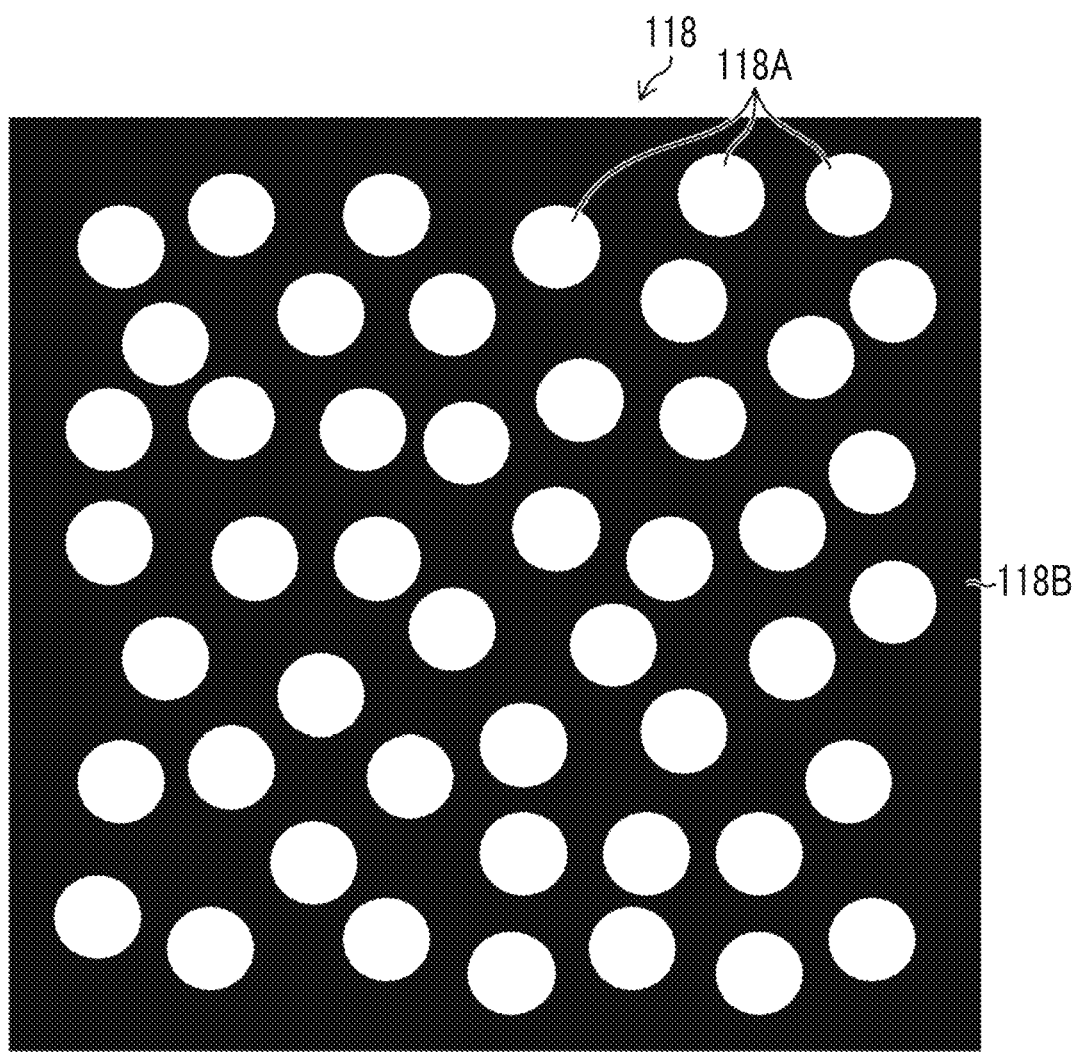
FIG. 22 is a diagram showing an example of a bored pattern mask.
Figure 25:
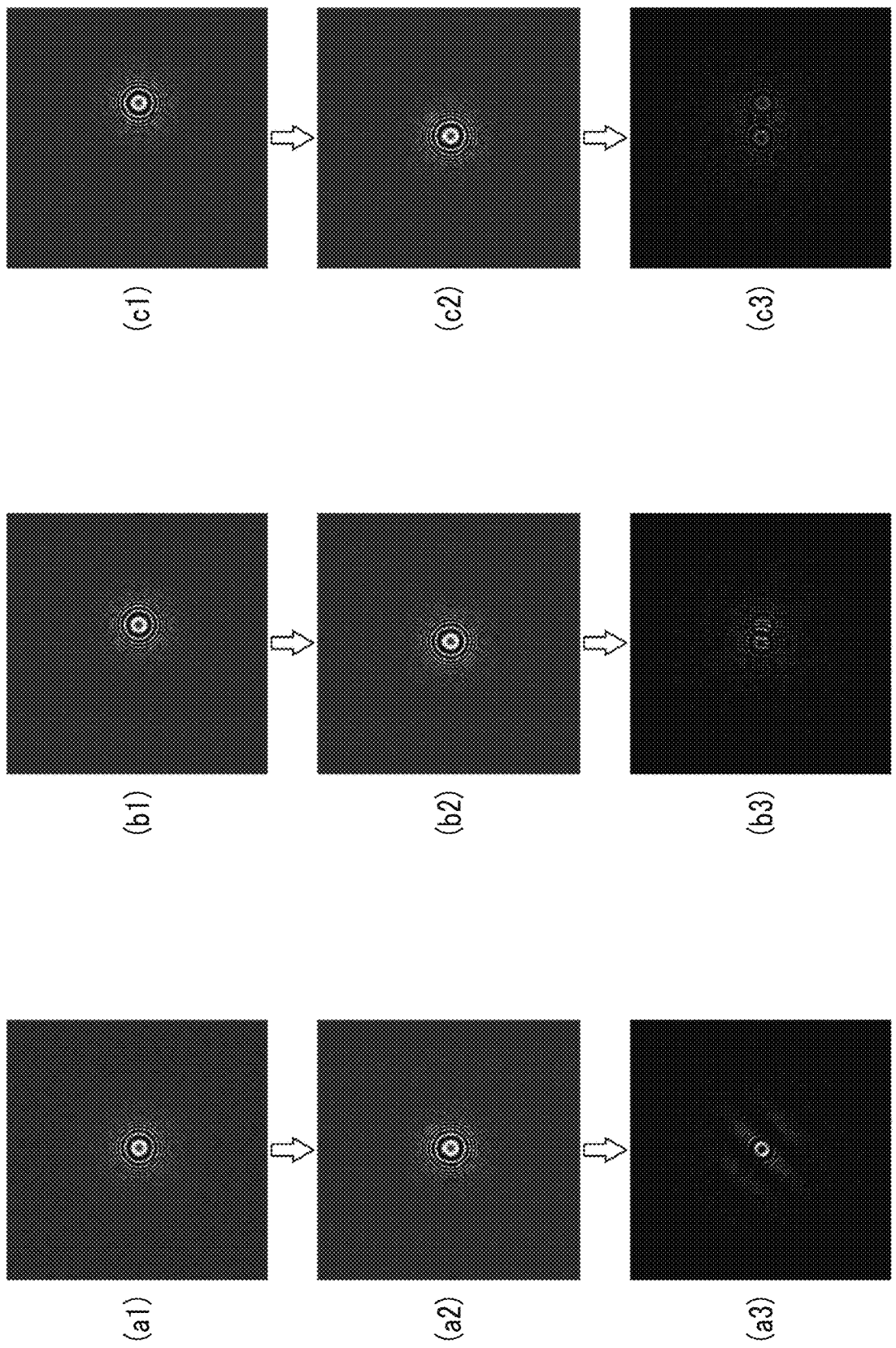
FIG. 25 is a diagram showing the relationship between an incidence direction of light and moire fringes in a case where a light source is present at a finite distance.
Figure 26:
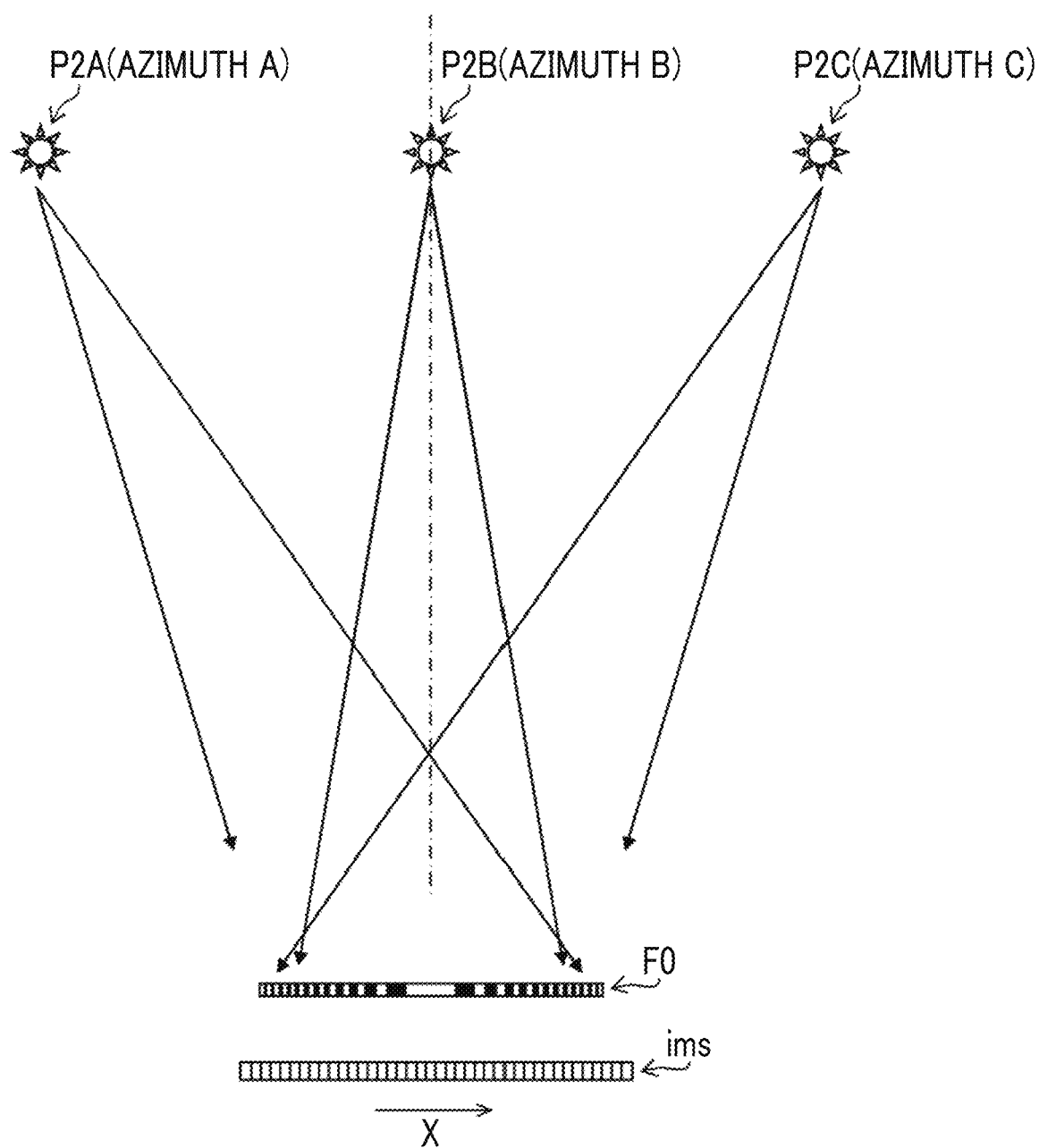
FIG. 26 is a diagram showing an aspect in which light is incident on a Fresnel zone plate and an image sensor of the related art from light sources present in front and oblique directions.
Figure 27:
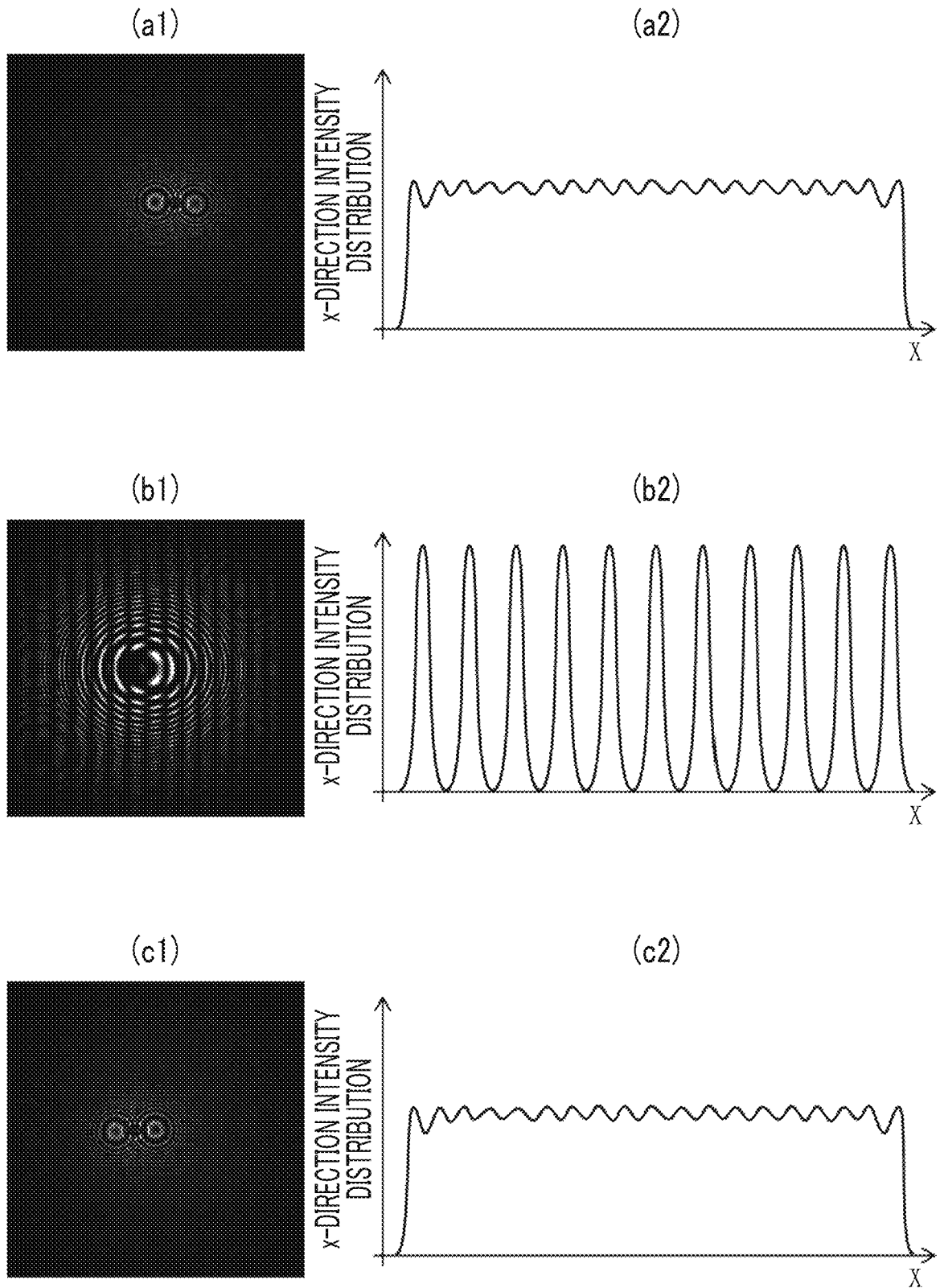
FIG. 27 is a diagram showing moire fringes and a signal intensity distribution in a situation shown in FIG. 26.
Figure 28:
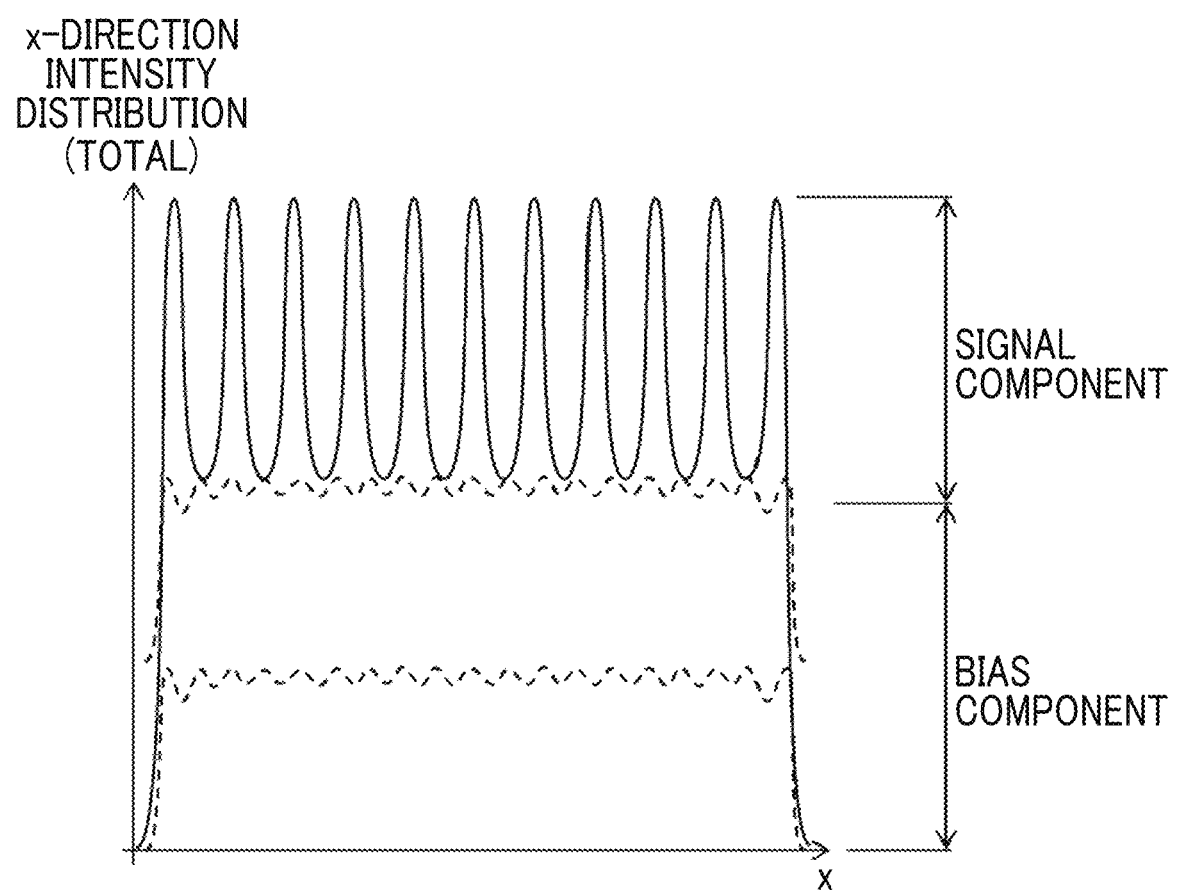
FIG. 28 is a diagram showing a total signal intensity distribution in the situation shown in FIG. 26.
Figure 29:
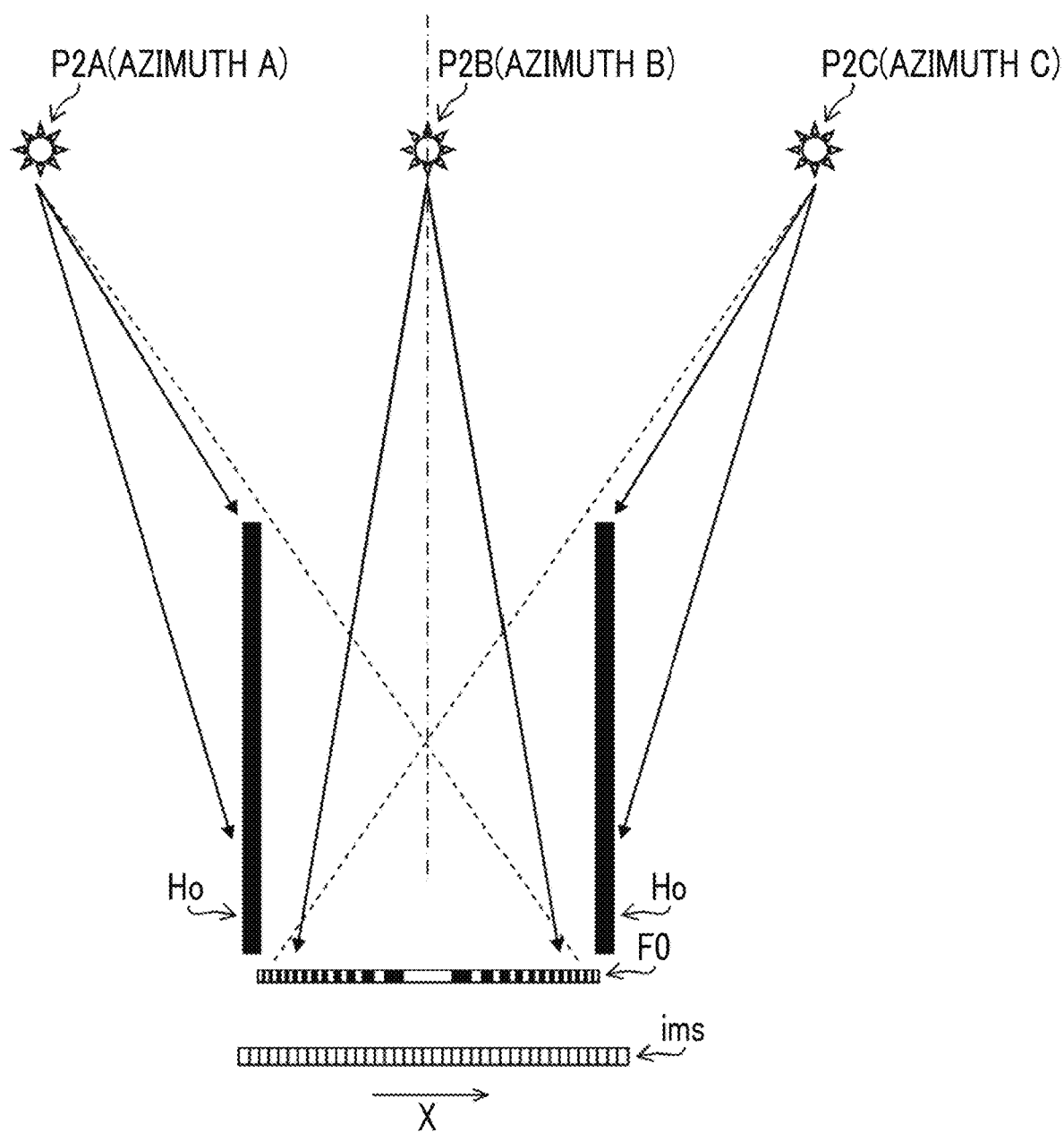
FIG. 29 is a diagram showing an aspect in which light incident from oblique directions is cut by a hood.
Figure 30:
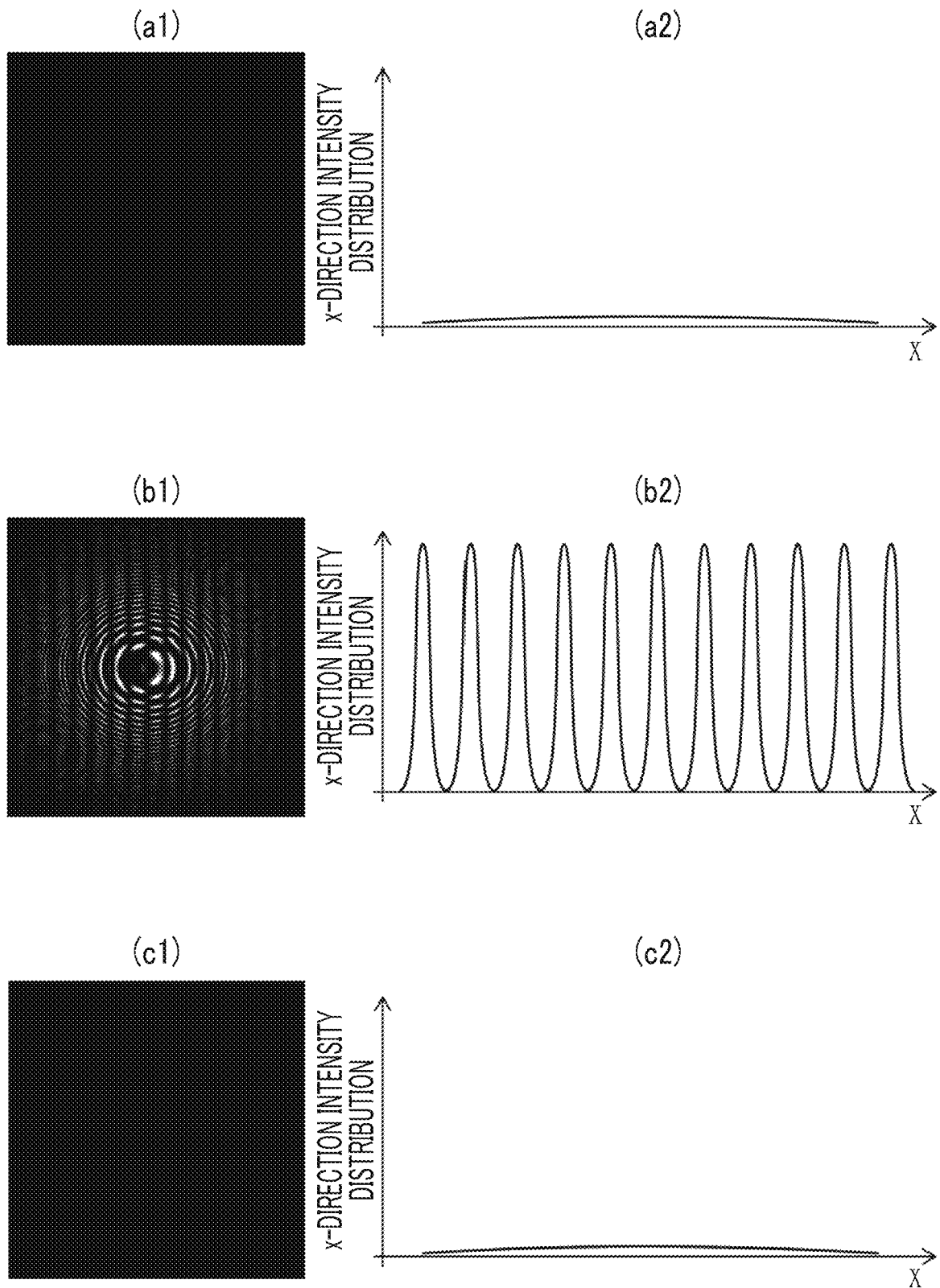
FIG. 30 is a diagram showing moire fringes and a signal intensity distribution in a situation shown in FIG. 29.
Figure 31:
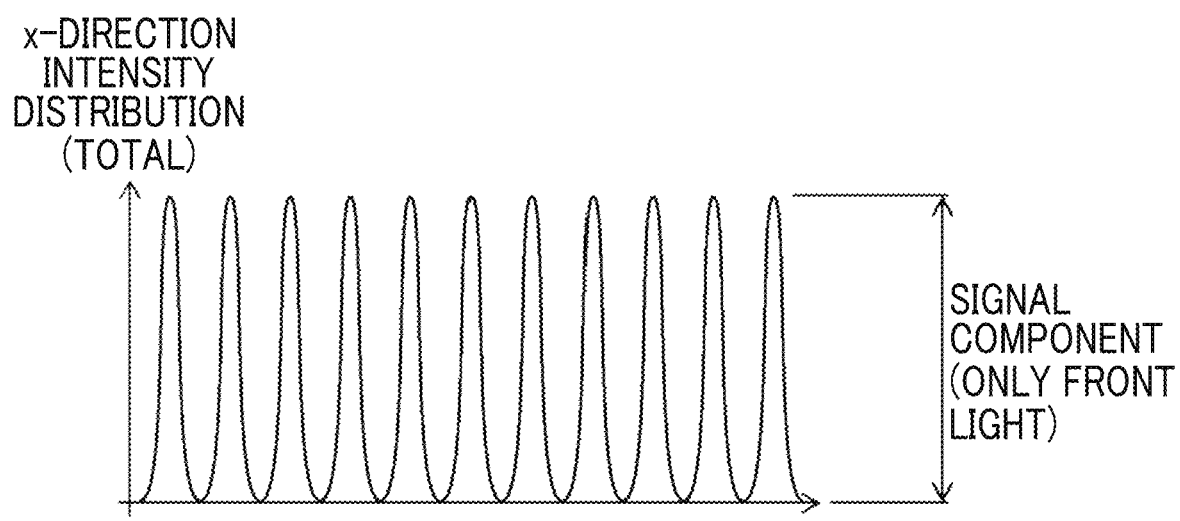
FIG. 31 is a diagram showing a total signal intensity distribution in the situation shown in FIG. 29.

FIG. 21 is a diagram showing another example 2 of an imaging apparatus and an imaging module, and shows an imaging apparatus 30 (imaging apparatus) having an imaging module 104 (imaging module) and an imaging apparatus body 204. The imaging module 104 comprises a pattern mask 118 (pattern mask), in which opening portions 118A (bores; see FIG. 22) as a transmissive region are arranged in a random manner in two-dimensional directions, and an imaging element 120 (directional sensor). As shown in FIG. 22, the pattern mask 118 is composed of a plurality of opening portions 118A and a peripheral light shielding portion 118B, and information indicating an arrangement pattern (properties, such as the shape, the size, and the interval of the bores) of the opening portions 118A is stored in the storage unit 224. Even in the imaging apparatus 30 having such a configuration, incident light from the subject is divided into a plurality of azimuthal regions by the imaging element 120, and the projection images corresponding to the azimuthal regions can be acquired. Restoration processing (for example, search for a least square error in the image processing unit 214) according to the properties of the arrangement pattern of the opening portions 118A and the projection images is executed, whereby it is possible to individually obtain high image quality restored images for a plurality of different directions (azimuthal regions) at a wide angle of view without using a lens. For example, as described in Tsuyoshi MIGITA and Naoki ASADA, "Fast and Stable Method for 3D Shape Recovery from an Image Sequence using Non-Linear Least Squares", Information Processing Society of Japan (IPSJ) Technical Report, 2004-CVIM-144(21), May 2004, the search for the least square error in the example 2 can be performed by a nonlinear least squares method that minimizes a difference (sum of squares residuals of a re-projection error) in comparison of a result of projecting an estimated model onto an image with observation, and a method taking into consideration fast and stable operation for the nonlinear least square method.

In FIGS. 21 and 22, the same configurations as those in FIG. 1 are represented by the same reference numerals, and detailed description thereof will not be repeated.

Although the embodiments and the examples of the invention have been described above, the invention is not limited to the above-described aspects, and various modifications can be made without departing from the spirit of the invention.

EXPLANATION OF REFERENCES

10: imaging apparatus
20: imaging apparatus
30: imaging apparatus
100: imaging module
102: imaging module
104: imaging module
110: Fresnel zone plate
112: pattern mask portion
114: light shielding portion
116: encoded pattern mask
116A: encoded pattern portion
116B: light shielding portion
118: pattern mask
118A: opening portion
118B: light shielding portion
120: imaging element
124: image sensor
124A1: pixel
124A2: pixel
124A3: pixel
124B1: pixel
124B2: pixel
124B3: pixel
124C1: pixel
124C2: pixel
124C3: pixel
130: imaging element
134: image sensor
136A1: light shielding mask
136A2: light shielding mask
136A3: light shielding mask
136B1: light shielding mask
136B2: light shielding mask
136B3: light shielding mask
136C1: light shielding mask
136C2: light shielding mask
136C3: light shielding mask
200: imaging apparatus body
202: imaging apparatus body
204: imaging apparatus body
210: image processing unit
210A: image acquisition unit
210B: composition processing unit
210C: restoration processing unit
210D: magnification unit
210E: magnification ratio acquisition unit
210F: combined image generation unit
212: image processing unit
214: image processing unit
220: storage unit
222: storage unit
224: storage unit
230: display unit
240: instruction input unit
A: azimuth
B: azimuth
C: azimuth
CIm: image
F0: Fresnel zone plate H: horizontal direction
Ho: hood
ImA: image
ImB: image
ImC: image
L: optical axis
MA1: microlens array
MA2: microlens array
MFA: image
MFB: image
MFC: image
ML1: microlens
ML2: microlens
P0: point light source
P1: point light source
P2A: point light source
P2B: point light source
P2C: point light source
P3A: point light source
P3B: point light source
P3C: point light source
PIA: projection image
PIB: projection image
PIC: projection image
PP0: projection pattern
PP1: projection pattern
PP2: projection pattern
PPA: projection pattern
PPB: projection pattern
PPC: projection pattern
V: vertical direction
ims: image sensor

What is claimed is:

1. An imaging apparatus comprising:
a pattern mask in which a transmissive region transmitting incident light and a light shielding region shielding incident light are arranged;
a directional sensor that has a light receiving surface close to which the pattern mask is provided, receives a projection image of the pattern mask with light from a subject through the pattern mask, divides the light incident on the pattern mask from the subject into a plurality of azimuthal regions with different directions, and acquires a plurality of the projection images corresponding to the plurality of divided azimuthal regions; and
a restored image generation unit that restores and generates a plurality of images of the subject corresponding to the plurality of azimuthal regions from the plurality of acquired projection images.

2. The imaging apparatus according to claim 1,
wherein a pattern of the arrangement is a pattern in which the transmissive region and the light shielding region compose a Fresnel zone plate, and
the restored image generation unit comprises
a composition processing unit that superimposes the plurality of acquired projection images and a projection pattern corresponding to the Fresnel zone plate through image processing, and
a restoration processing unit that performs Fourier transform on a plurality of moire fringes formed of the plurality of projection images and the projection pattern superimposed and restores and generates the plurality of images of the subject.

3. The imaging apparatus according to claim 2,
wherein the composition processing unit superimposes the plurality of projection images and a plurality of projection patterns corresponding to the plurality of projection images obtained by shifting the projection pattern corresponding to the Fresnel zone plate according to directions of the plurality of azimuthal regions through image processing.

4. The imaging apparatus according to claim 3,
wherein the plurality of azimuthal regions include a center region of an imaging range centering on a direction perpendicular to a surface of the Fresnel zone plate, and
the composition processing unit superimposes the projection pattern corresponding to the Fresnel zone plate on a projection image of the center region among the plurality of projection images through image processing.

5. The imaging apparatus according to claim 3, further comprising:
a storage unit that stores the plurality of projection patterns; and
a magnification unit that reads the plurality of projection patterns from the storage unit and magnifies the plurality of projection patterns according to a distance of the subject,
wherein the composition processing unit superimposes the plurality of projection images and the plurality of projection patterns magnified by the magnification unit through image processing.

6. The imaging apparatus according to claim 5, further comprising:
a display unit that displays an image restored by the restoration processing unit; and
an instruction input unit through which an instruction on a magnification ratio of the plurality of projection patterns or a subject distance is manually input,
wherein the magnification unit magnifies the plurality of projection patterns read from the storage unit based on an instruction input of the magnification ratio or the subject distance from the instruction input unit.

7. The imaging apparatus according to claim 5, further comprising:
a magnification ratio acquisition unit that automatically acquires a magnification ratio of the plurality of projection patterns at which resolution of an image restored by the restoration processing unit becomes maximum,
wherein the magnification unit magnifies the plurality of projection patterns read from the storage unit based on the magnification ratio acquired by the magnification ratio acquisition unit.

8. The imaging apparatus according to claim 3, further comprising:
a storage unit that stores a plurality of projection patterns with different magnification ratios according to a subject distance as the plurality of projection patterns;
a display unit that displays an image restored by the restoration processing unit; and
an instruction input unit through which an instruction on a magnification ratio of the plurality of projection patterns or a subject distance is manually input,
wherein the composition processing unit, based on an instruction input of the magnification ratio or the subject distance from the instruction input unit, reads the plurality of projection patterns with the corresponding magnification ratio from the storage unit and superimposes the plurality of projection images and the plurality of read projection patterns through image processing.

9. The imaging apparatus according to claim 3, further comprising:
- a storage unit that stores a plurality of projection patterns with different magnification ratios according to a subject distance as the plurality of projection patterns; and
- a magnification ratio acquisition unit that automatically acquires a magnification ratio of the plurality of projection patterns at which resolution of an image restored by the restoration processing unit becomes maximum,
- wherein the composition processing unit, based on the magnification ratio acquired by the magnification ratio acquisition unit, reads the plurality of projection patterns with the corresponding magnification ratio from the storage unit and superimposes the plurality of projection images and the plurality of read projection patterns through image processing.

10. The imaging apparatus according to claim 1,
wherein the directional sensor is a sensor composed of
- an image sensor having a plurality of pixels composed of photoelectric conversion elements arrayed in a two-dimensional manner, and
- a microlens array provided on an incidence surface side of the image sensor, one microlens composing the microlens array being provided for every a plurality of pixels corresponding to the plurality of azimuthal regions, light incident on each microlens being divided into and incident on a plurality of pixels corresponding to the plurality of azimuthal regions.

11. The imaging apparatus according to claim 1,
wherein the directional sensor is a sensor composed of
- an image sensor having a plurality of pixels composed of photoelectric conversion elements arrayed in a two-dimensional manner,
- a microlens array provided for each pixel of the image sensor, and
- a plurality of kinds of light shielding masks which are provided between the pixels of the image sensor and the microlenses of the microlens array, respectively, and in which openings corresponding to the plurality of azimuthal regions are formed.

12. The imaging apparatus according to claim 11,
wherein the plurality of kinds of light shielding masks are arranged in the same density for a plurality of pixels of the image sensor.

13. The imaging apparatus according to claim 11,
wherein the plurality of kinds of light shielding masks are arranged in different densities for a plurality of pixels of the image sensor.

14. The imaging apparatus according to claim 1, further comprising:
- a combined image generation unit that combines the plurality of images restored by the restored image generation unit and generates one image.

15. The imaging apparatus according to claim 1,
wherein a pattern of the arrangement is an encoded pattern.

16. The imaging apparatus according to claim 1,
wherein a pattern of the arrangement is a pattern in which a plurality of openings as the transmissive region are arranged in a random manner in two-dimensional directions.

* * * * *